United States Patent
Choi et al.

(10) Patent No.: US 9,674,534 B2
(45) Date of Patent: Jun. 6, 2017

(54) METHOD AND APPARATUS FOR ENCODING MULTI-VIEW VIDEO PREDICTION CAPABLE OF VIEW SWITCHING, AND METHOD AND APPARATUS FOR DECODING MULTI-VIEW VIDEO PREDICTION CAPABLE OF VIEW SWITCHING

(71) Applicant: SAMSUNG ELECTRONICS CO., LTD., Suwon-si (KR)

(72) Inventors: Byeong-doo Choi, Siheung-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 14/373,405

(22) PCT Filed: Jan. 21, 2013

(86) PCT No.: PCT/KR2013/000467
§ 371 (c)(1),
(2) Date: Jul. 21, 2014

(87) PCT Pub. No.: WO2013/109112
PCT Pub. Date: Jul. 25, 2013

(65) Prior Publication Data
US 2015/0010074 A1    Jan. 8, 2015

Related U.S. Application Data

(60) Provisional application No. 61/588,618, filed on Jan. 19, 2012.

(51) Int. Cl.
*H04N 19/597* (2014.01)
*H04N 19/30* (2014.01)
(Continued)

(52) U.S. Cl.
CPC ......... *H04N 19/157* (2014.11); *H04N 19/172* (2014.11); *H04N 19/30* (2014.11);
(Continued)

(58) Field of Classification Search
CPC .. H04N 19/597; H04N 19/172; H04N 19/187; H04N 19/96; H04N 13/0048;
(Continued)

(56) References Cited

U.S. PATENT DOCUMENTS 6,043,838 A * 3/2000 Chen ............... G06T 7/0022
                                                  348/42
8,121,425 B2 * 2/2012 Choi ............... H04N 19/597
                                                  382/238

(Continued)

FOREIGN PATENT DOCUMENTS

KR    10-0762783 B1    10/2007
KR    10-2009-0083746 A    8/2009
(Continued)

OTHER PUBLICATIONS

International Search Report, dated Apr. 23, 2014, issued by the International Searching Authority in counterpart International Application No. PCT/KR2013/000467.
(Continued)

*Primary Examiner* — Nathnael Aynalem
(74) *Attorney, Agent, or Firm* — Sughrue Mion, PLLC

(57) ABSTRACT

Video encoding and decoding accompanying inter prediction and motion compensation in a multi-view video prediction structure. A multi-view video prediction restoring method includes receiving a base view image stream and additional view image streams for two or more additional views; restoring base view images including base view anchor pictures that are I-picture type images by performing motion compensation referring to the base view images by
(Continued)

using the base view image stream; and restoring images of a first additional view by performing at least one of disparity compensation referring to the restored base view images and motion compensation referring to images except for an anchor picture having a preceding reproduction order among the images of the first additional view by using an image stream of the first additional view among the additional view image streams.

2 Claims, 27 Drawing Sheets

(51) Int. Cl.
| | |
|---|---|
| H04N 19/51 | (2014.01) |
| H04N 19/52 | (2014.01) |
| H04N 19/157 | (2014.01) |
| H04N 19/172 | (2014.01) |
| H04N 19/119 | (2014.01) |
| H04N 19/96 | (2014.01) |

(52) U.S. Cl.
CPC ........... *H04N 19/51* (2014.11); *H04N 19/597* (2014.11); *H04N 19/119* (2014.11); *H04N 19/96* (2014.11)

(58) Field of Classification Search
CPC ........... H04N 19/00715; H04N 19/114; H04N 19/119; H04N 19/157; H04N 19/188; H04N 19/30; H04N 19/33; H04N 19/46; H04N 19/503; H04N 19/51; H04N 19/513; H04N 19/573; H04N 19/577; H04N 19/587; H04N 19/61; H04N 19/70
USPC ........................................ 375/240.01–240.29
See application file for complete search history.

(56) References Cited

U.S. PATENT DOCUMENTS

| | | | |
|---|---|---|---|
| 2008/0170753 A1 | 7/2008 | Park et al. | |
| 2008/0181228 A1* | 7/2008 | Hannuksela ... | H04N 21/234327 370/394 |
| 2009/0129465 A1* | 5/2009 | Lai ........................ | H04N 19/597 375/240.02 |
| 2009/0190662 A1 | 7/2009 | Park et al. | |
| 2009/0268816 A1* | 10/2009 | Pandit .................. | H04N 19/597 375/240.12 |
| 2009/0323824 A1* | 12/2009 | Pandit ................ | H04N 21/2365 375/240.26 |
| 2010/0002761 A1* | 1/2010 | Pandit .................. | H04N 19/597 375/240.01 |
| 2010/0020871 A1* | 1/2010 | Hannuksela ......... | H04N 21/438 375/240.12 |
| 2010/0284466 A1* | 11/2010 | Pandit .................. | H04N 19/597 375/240.16 |
| 2010/0316134 A1* | 12/2010 | Chen ................ | H04N 21/21805 375/240.25 |
| 2011/0012994 A1 | 1/2011 | Park et al. | |
| 2011/0019746 A1 | 1/2011 | Lim et al. | |
| 2011/0081133 A1* | 4/2011 | Chen .................... | G11B 27/005 386/356 |
| 2011/0286512 A1 | 11/2011 | Lim et al. | |
| 2012/0189060 A1* | 7/2012 | Lee ...................... | H04N 19/597 375/240.16 |
| 2012/0269275 A1* | 10/2012 | Hannuksela ....... | H04N 13/0048 375/240.25 |
| 2014/0132719 A1 | 5/2014 | Choi et al. | |

FOREIGN PATENT DOCUMENTS

| | | |
|---|---|---|
| KR | 10-0968204 B1 | 7/2010 |
| KR | 10-2011-0007928 A | 1/2011 |
| KR | 10-2011-0009649 A | 1/2011 |

OTHER PUBLICATIONS

Written Opinion, dated Apr. 23, 2014, issued by the International Searching Authority in counterpart International Application No. PCT/KR2013/000467.

* cited by examiner

FIG. 14
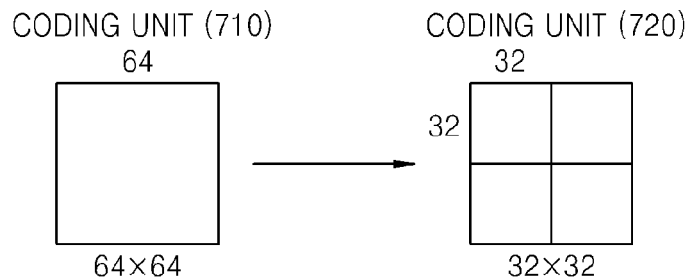
FIG. 15
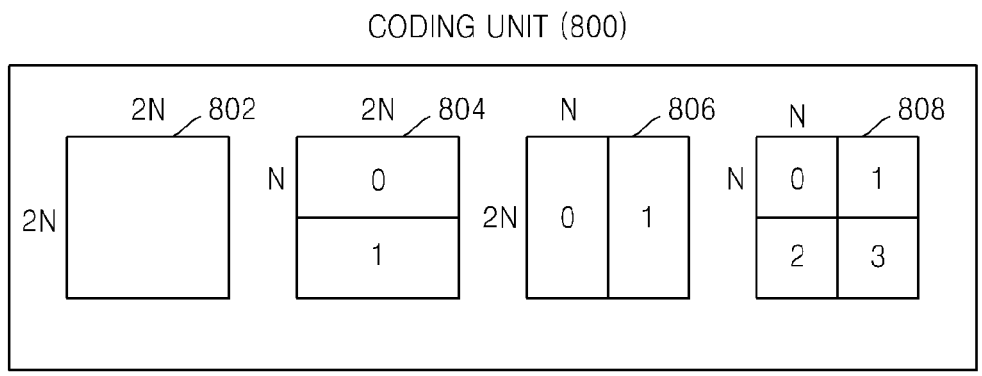
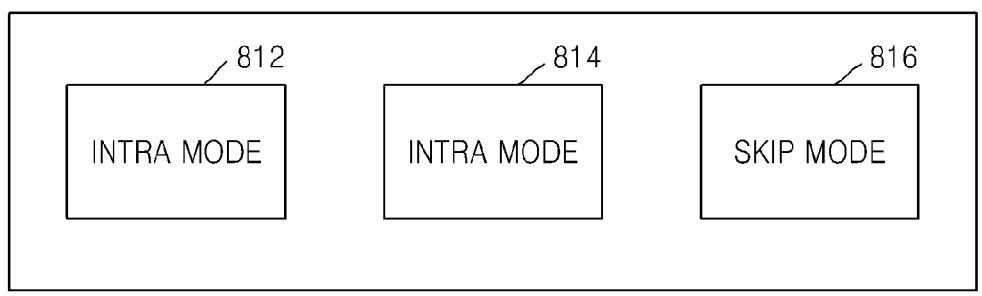
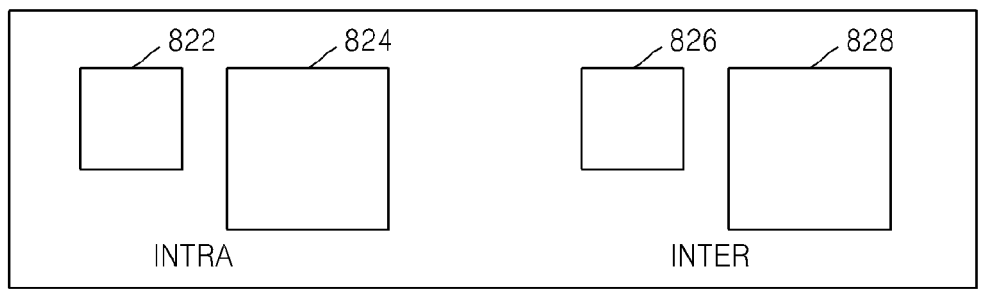

CODING UNIT (1010)

PREDICTION UNIT (1060)

METHOD AND APPARATUS FOR ENCODING MULTI-VIEW VIDEO PREDICTION CAPABLE OF VIEW SWITCHING, AND METHOD AND APPARATUS FOR DECODING MULTI-VIEW VIDEO PREDICTION CAPABLE OF VIEW SWITCHING

RELATED APPLICATIONS

This is a national stage application of PCT/KR2013/000467 filed on Jan. 21, 2013 which claims the benefit of U.S. Provisional Application 61/588,618, filed on Jan. 19, 2012, in the United States Patent and Trademark Office, the disclosures of which are hereby incorporated herein in their entirety by reference.

BACKGROUND

1. Field

Exemplary embodiments relate to methods and apparatuses for encoding and decoding a video in a multi-view video prediction structure for inter prediction and motion compensation.

2. Related Art

As hardware for reproducing and storing high resolution or high quality video content is being developed and supplied, a need for a video codec for effectively encoding or decoding the high resolution or high quality video content is increasing. A video is encoded according to a limited encoding method based on a macroblock having a predetermined size.

Image data of a spatial region is transformed into coefficients of a frequency region via frequency transformation. According to a video codec, an image is split into blocks having a predetermined size, discrete cosine transformation (DCT) is performed for each respective block, and frequency coefficients are encoded in block units, for rapid calculation for frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

According to a multi-view video code, a base view video and one or more additional view videos are encoded and decoded. By removing temporal/spatial redundancy between the base view video and the additional view video and redundancy between views, an amount of data of the base view video and the additional view video can be reduced.

SUMMARY

According to an aspect of an exemplary embodiment, a method and apparatus for encoding multi-view video prediction and a method and apparatus for decoding multi-view video prediction that easily enable view switching during a multi-view video decoding process by providing a new multi-view video prediction structure are provided.

According to an aspect of an exemplary embodiment, a method of decoding multi-view video prediction that easily enables view switching although there is no change in the multi-view video prediction structure is provided.

According to an aspect of an exemplary embodiment, there is provided a multi-view video prediction restoring method including receiving a base view image stream and additional view image streams for two or more additional views; restoring base view images including base view anchor pictures that are I-picture type images by performing motion compensation by referring to the base view images by using the base view image stream; and restoring images of a first additional view by performing at least one of disparity compensation by referring to the restored base view images and motion compensation by referring to images except for an anchor picture having a preceding reproduction order among the images of the first additional view by using an image stream of the first additional view among the additional view image streams.

According to an aspect of an exemplary embodiment, there is provided a multi-view video prediction restoring method including receiving a base view image stream and additional view image streams for two or more additional views; restoring base view images including base view anchor pictures that are I-picture type images by performing motion compensation by referring to the base view images by using the base view image stream; and restoring images of a first additional view by performing at least one of disparity compensation by referring to the restored base view images and motion compensation by referring to images except for an anchor picture having a preceding reproduction order among the images of the first additional view by using an image stream of the first additional view among the additional view image streams.

The multi-view video prediction restoring method may further include: when view switching occurs during restoration of the images of the first additional view, restoring images of a second additional view by performing at least one of disparity compensation by referring to the restored base view images and motion compensation by referring to images except for an anchor picture having a preceding reproduction order among the images of the second additional view by starting an anchor picture of the second additional view in which the view switching occurs and having a picture order count (POC) by using an image stream of the second additional view.

The restoring of the images of the first additional view may include: restoring the images of the first additional view by referring to an anchor picture having a later POC order except for an image of a preceding POC order that belongs to a group of pictures (GOP) previous to a GOP to which a current additional view image belongs among the images of the first additional view.

The multi-view video prediction restoring method may further include: restoring a base view random access image that is an anchor picture of a randomly accessible point and additional view random access images according to additional views by using the received base view image stream and additional view image streams; and storing the base view random access image and the additional view random access images in a long-term memory, wherein the restoring of the images of the first additional view includes: restoring the images of the first additional view by performing motion compensation by referring to the additional view random access images, and wherein a current random access point and a view switching point at which views are switchable from the first additional view to the second additional view are set to be separated from each other.

The multi-view video prediction restoring method may further include: every time the view switching occurs, deleting remaining images except for the current random access image among images stored in a reference image memory.

According to an aspect of another exemplary embodiment, there is provided a multi-view video prediction method including: generating a base view image stream including a residual value of base view images including base view anchor pictures that are I-picture type images by performing inter prediction between the base view images; and generating additional view image streams including a residual value of additional view images generated by performing at least one of inter-view prediction that predicts the additional view images with reference to the base view images and inter prediction that predicts the additional view images with reference to additional view images of the same view except for an anchor picture having a preceding reproduction order among the additional view images of the same view.

The generating of the additional view image streams may include: predicting the additional view image that is a B-picture type image by referring to an anchor picture having a later POC order but not referring to an image of a preceding POC order that belongs to a GOP previous to a GOP to which a current additional view image belongs among the additional view images.

The multi-view video prediction method may further include: storing a base view random access image that is an anchor picture of a randomly accessible point and additional view random access images according to additional views in a long-term memory; wherein the generating of the additional view image streams includes: generating the additional view image streams by performing inter prediction by referring to the additional view random access images, and wherein a current random access point and a view switching point at which views are switchable from a first additional view to a second additional view are set to be separated from each other.

According to an aspect of another exemplary embodiment, there is provided a multi-view video prediction restoring method including: receiving a base view image stream and additional view image streams for two or more additional views; restoring base view images including base view anchor pictures that are I-picture type images by performing motion compensation by referring to the base view images by using the base view image stream; restoring images of a first additional view by performing at least one of disparity compensation by referring to the restored base view images and motion compensation by referring to the images of the first additional view by using an image stream of the first additional view among the additional view image streams; when view switching occurs during restoration of the images of the first additional view, restoring a first anchor picture of a second additional view previous to a view switching point by using an image stream of the second additional view; and restoring images of the second additional view by performing at least one of disparity compensation by referring to the restored base view images and motion compensation by referring to the images of the second additional view including the restored first anchor picture by starting from a second anchor picture of the second additional view of the view switching point.

The restoring of the images of the second additional view may include: restoring B-picture type images by referring to the restored first anchor picture after a second anchor picture of the second additional view of the view switching point.

According to an aspect of another exemplary embodiment, there is provided a multi-view video prediction restoring apparatus including: a base view image restorer for restoring base view images including base view anchor pictures that are I-picture type images by performing motion compensation by referring to the base view images by using a received base view image stream; a first additional view image restorer for restoring images of a first additional view by performing at least one of disparity compensation by referring to the restored base view images and motion compensation referring to images except for an anchor picture having a preceding reproduction order among the images of the first additional view by using an image stream of the first additional view among the received additional view image streams; and a view switcher for, if view switching occurs during restoration of the images of the first additional view, restoring images of a second additional view by performing at least one of disparity compensation by referring to the restored base view images and motion compensation by referring to images except for an anchor picture having a preceding reproduction order among the images of the second additional view by starting an anchor picture of the second additional view of a view switching point by using an image stream of the second additional view.

According to an aspect of another exemplary embodiment, there is provided a multi-view video prediction apparatus including: a base view encoder for generating a base view image stream including a residual value of base view images including base view anchor pictures that are I-picture type images by performing inter prediction between the base view images; and an additional view encoder for generating additional view image streams including a residual value of additional view images generated by performing at least one of inter-view prediction that predicts the additional view images with reference to the base view images and inter prediction that predicts the additional view images with reference to additional view images of the same view but not with reference to an anchor picture having a preceding reproduction order among the additional view images of the same view.

According to an aspect of another exemplary embodiment, there is provided a computer readable recording medium having recorded thereon a program for executing the multi-view video prediction restoring method.

According to an aspect of another exemplary embodiment, there is provided a computer readable recording medium having recorded thereon a program for executing the multi-view video prediction method.

A multi-view video prediction apparatus according to an exemplary embodiment generates an additional view image stream according to a prediction structure for inter prediction in order to prevent an anchor picture of a second additional view restored immediately before a current image is encoded from being referred to, thereby enabling inter prediction although there is no anchor picture right before views are switched.

A multi-view video prediction restoring apparatus according to an exemplary embodiment does not need to refer to an anchor picture of a second additional view restored immediately before a current image is decoded although views are switched to the second additional view during restoration of images of a first additional view, thereby obtaining all reference images for motion compensation and restoring images of the second additional view without any decoding error or image loss.

BRIEF DESCRIPTION OF THE DRAWINGS

FIG. 14 is a diagram for describing a relationship between a coding unit and transformation units, according to an exemplary embodiment;

FIG. 15 is a diagram for describing encoding information of coding units corresponding to a coded depth, according to an exemplary embodiment;

DETAILED DESCRIPTION OF THE EXEMPLARY EMBODIMENTS

Hereinafter, a multi-view video prediction apparatus, a multi-view video prediction restoring apparatus, a multi-view video prediction method, and a multi-view video prediction restoring method will be described with reference to FIGS. 1A through 7B. A multi-view video prediction apparatus, a multi-view video prediction restoring apparatus, a multi-view video prediction method, and a multi-view video prediction restoring method, based on coding units having a tree structure will be described with reference to FIGS. 8 through 20. In addition, a multi-view video prediction method, a multi-view video prediction restoring method, a video encoding method, and a video decoding method will be described with reference to FIGS. 21 through 27. Hereinafter, the term 'image' may refer to a still image or a moving picture, that is, a video itself.

First, with reference to FIGS. 1A through 7B, a multi-view video prediction apparatus, a multi-view video prediction restoring apparatus, a multi-view video prediction method, and a multi-view video prediction restoring method according to an exemplary embodiment will be described.

Figure 1A:
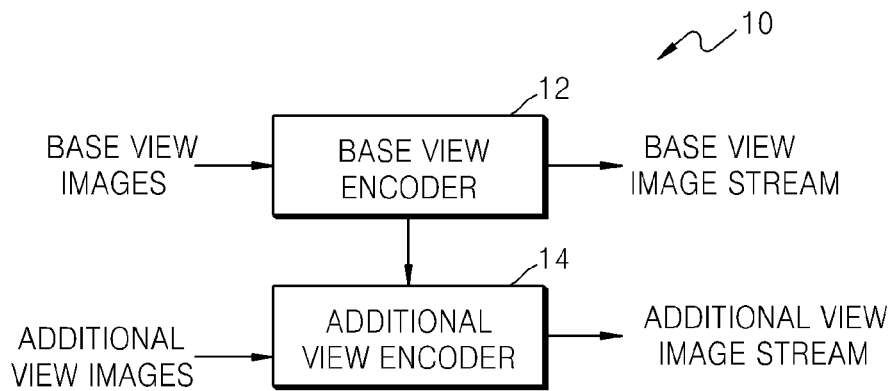
FIG. 1A is a block diagram of a multi-view video prediction apparatus according to an exemplary embodiment.

FIG. 1A is a block diagram of a multi-view video prediction apparatus 10 according to an exemplary embodiment.

The multi-view video prediction apparatus 10 according to an exemplary embodiment includes a base view encoder 12 and an additional view encoder 14.

The multi-view video prediction apparatus 10 according to an exemplary embodiment encodes base view images and additional view images. For example, center view images, left view images, and right view images may be encoded, an encoding result of the center view images may be output in a base view image stream, and an encoding result of the left and right view images may be output in first and second additional view image streams, respectively.

In the presence of three or more additional views, base view images, first additional view images about a first additional view, second additional view images about a second additional view, through $K_{th}$ additional view images about a $K_{th}$ additional view may be encoded. Thus, an encoding result of the base view images may be output in an additional view image stream and an encoding result of the first, second, through $K_{th}$ additional view images may be output in first, second, through $K_{th}$ additional view image streams.

When the multi-view video prediction apparatus 10 according to an exemplary embodiment encodes images according to views corresponding to a plurality of views according to scalable video coding, the base view image stream on which encoding data of base view images is recorded may be encoded as a base layer image stream, and the additional view image stream on which encoding data of additional view images is recorded may be encoded as an enhancement layer image stream.

The multi-view video prediction apparatus 10 encodes each video image for each respective block. A block may have a square shape, a rectangular shape, or any geometric shape and is not limited to a data unit having a predetermined size. According to an exemplary embodiment, a block may be a maximum coding unit, a coding unit, a prediction unit, a transformation unit, or the like from among coding units according to a tree structure. Video encoding and decoding methods based on coding units according to a tree structure will be described below with reference to FIGS. 8 through 20.

The multi-view video prediction apparatus 10 may perform inter prediction for performing prediction by referring to the same view images. Through inter prediction, a motion vector indicating motion information between the current image and a reference image, and a residual that is a differential component between the current image and the reference image may be generated.

In addition, the multi-view video prediction apparatus 10 may perform inter-view prediction for predicting additional view images with reference to the base view images. The multi-view video prediction apparatus 10 may perform inter-view prediction for predicting the second additional view images with reference to the first additional view images. Through inter-view prediction, a disparity indicating motion information between the current image and the reference image, and the residual that is a differential component between the current image and the reference image may be generated.

Inter prediction and inter-view prediction may be performed based on a block such as a coding unit, a prediction unit, a transformation unit, or the like.

The base view encoder 12 may encode the base view images to generate the base view image stream. The base view encoder 12 may perform inter prediction between the base view images. The base view encoder 12 may encode base view anchor pictures that are I-picture type images from among the base view images without referring to any image. The base view encoder 12 may perform inter prediction on base view images but not on the base view anchor pictures with reference to different base view images.

The base view encoder 12 may generate residual values via inter prediction of the base view images but not the base view anchor picture. Intra prediction may be performed on the base view anchor pictures with reference to peripheral pictures included in an image. The base view encoder 12 may encode resultant data generated by performing inter prediction or intra prediction and generate encoded data. For example, transformation, quantization, quantization, entropy encoding, or the like may be performed on an image block on which the resultant data generated by performing inter prediction or intra prediction is recorded.

The base view encoder 12 may generate the base view image stream including encoded data of the base view anchor picture and encoded data of the remaining base view images. The base view encoder 12 may output motion vectors generated via inter prediction between the base view images along with the base view image stream.

The additional view encoder 14 may encode the additional view images to generate the additional view image stream. The additional view encoder 14 may perform inter-view prediction referring to images of different views and inter prediction referring to images of the same view in order to encode the additional view images.

The additional view encoder 14 may perform inter-view prediction for predicting the additional view images with reference to the base view images. With regard to a predetermined additional view, inter-view prediction may be performed with reference to not only the base view images but also images of different additional views instead of a current additional view.

The additional view encoder 14 may perform inter prediction for predicting a current additional view image with reference to an anchor picture between additional view images of the same view.

The additional view encoder 14 may perform inter prediction of the current additional view image with reference to additional view anchor pictures that are restored prior to restoration of a current additional view anchor picture among the additional view anchor pictures.

However, the additional view encoder 14 may perform inter prediction of the current additional view image with reference to images except for an anchor picture having a preceding reproduction order among the additional view images of the same view.

The additional view encoder 14 may encode residual values of additional view images, which are generated via the inter-view prediction referring to the base view images and inter prediction referring to images of the same view. In more detail, transformation, quantization, entropy encoding, or the like may be performed on an image block of the residual value. Thus, the additional view encoder 14 may generate an additional view image stream including encoded data of the residual values of the additional view images. The additional view encoder 14 may output motion vectors generated via inter prediction between the additional view images and disparity information generated via inter-view prediction referring to images of different views along with the additional view image stream.

Figure 1B:
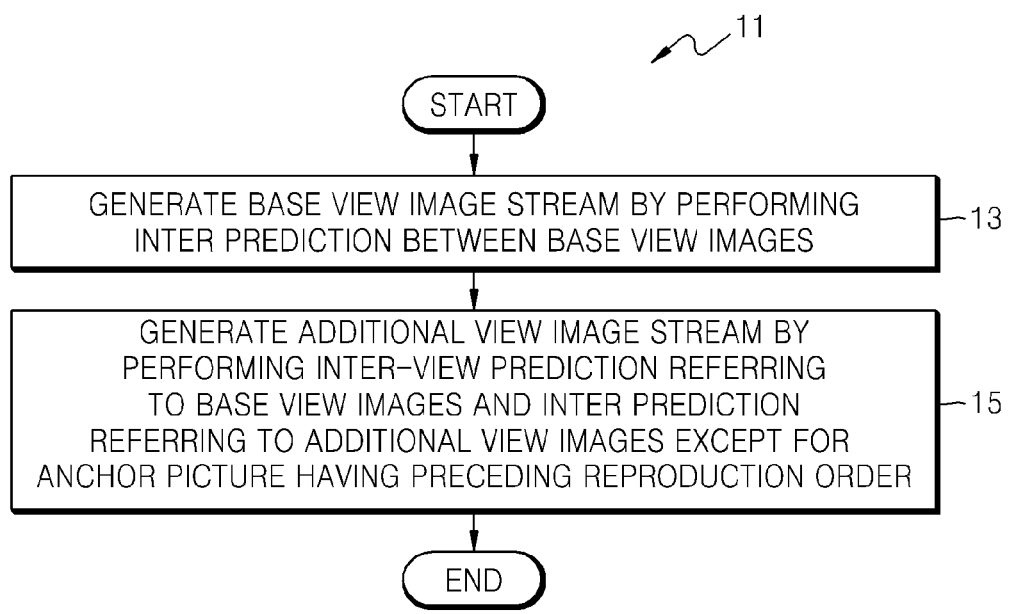
FIG. 1B is a flowchart of a multi-view video prediction method performed by the multi-view video prediction apparatus of FIG. 1A according to an exemplary embodiment.

An operation of the multi-view video prediction apparatus 100 according to an exemplary embodiment will now be described with reference to FIG. 1B below. FIG. 1B is a flowchart of a multi-view video prediction method 11 performed by the multi-view video prediction apparatus 10 of FIG. 1A according to an exemplary embodiment.

In operation 13, the base view encoder 12 may perform inter prediction between base view images including base view anchor pictures that are I-picture type pictures, generate residual values of the base view images, and generate a base view image stream including encoded data of the residual values.

In operation 15, the additional view encoder 14 may perform at least one of inter-view prediction and inter prediction for each of two or more additional views and generate an additional view image stream for each view. If residual values are generated by performing at least one of inter-view prediction and inter prediction, the additional view image stream including the encoded data of the residual values may be generated.

The additional view encoder 14 may perform inter-view prediction for predicting the current additional view image with reference to at least one of the base view images and different additional view images.

The additional view encoder 14 may perform inter prediction for predicting additional view images with reference to the additional view images except for the anchor picture having a preceding reproduction order among the additional view images of the same view. For example, among additional view anchor pictures of the same view adjacent to the current additional view image according to a reproduction order, an anchor picture positioned prior to the current additional view image may not be used as a reference image.

An anchor picture among the additional view images may be a P-picture type picture. Prediction may be performed on additional view images that are B-picture type images with reference to the anchor picture that is the P-picture type picture. In this regard, the additional view encoder 14 may refer to only an anchor picture having a later picture order count (POC) order but not to an anchor picture having a POC order preceding a POC order of the additional view images that are B-picture type images, to predict the additional view images that are B-picture type images.

Prediction may be performed on the current additional view image with reference to an image that belongs to a current group of picture (GOP) and is restored prior to the current additional view image among the additional view images, but not with reference to an image of the preceding POC order that belongs to a GOP previous to the current POC to which the current additional view image belongs. An anchor picture may be firstly restored among images that belong to one GOP. Thus, the additional view encoder 14 may perform prediction on the current additional view image with reference to the anchor picture that belongs to the current GOP and having a POC order later than the current additional view image, but not with reference to the image of the preceding POC order that belongs to the previous GOP.

According to another exemplary embodiment, the multi-view video prediction apparatus 10 may store a base view random access image that is an anchor picture of a randomly accessible point and additional view random access images according to additional views in a long-term memory.

Restored images that may be used as reference images for predicting different images may be stored in a reference memory. In a general reference image, the restored images stored in the reference memory are used as reference images of adjacent images according to a prediction order, and thus the restored images stored in the reference memory are deleted during a memory refresh cycle. However, the long-term memory is a storage space in which a long-term reference image that is not deleted during a memory refresh cycle of an image memory and may be used as a reference image of a different image is stored for a long time.

According to another exemplary embodiment, the additional view encoder 14 may perform inter prediction with reference to an additional view random access image and remaining images among the additional view images of the same view and generate the additional view image stream. According to another exemplary embodiment, the additional view encoder 14 may predict additional view images with reference to the additional view random access image and the remaining images among the additional view images of the same view, but not with reference to the anchor picture having a preceding reproduction order.

According to another exemplary embodiment, the additional view encoder 14 may set a current random access point and a point at which views are switchable from a first additional view to a second additional view to be separated from each other.

For example, among the base view images and the additional view images, a random access point may be allocated to each anchor picture positioned in a first POC cycle, and a view switching point may be allocated to each anchor picture positioned in a second POC cycle.

The first POC cycle for the random access point is greater than the second POC cycle for the view switching point, and thus at least one view switching point may pass while the random access point passes once. Thus, a random access section from the current random access point to a next random access point may include the current random access point and the at least one view switching point.

The current random access point is not deleted during the random access section after being stored in the memory. Thus, every time at least one view switching point occurs during the random access section, the restored images stored in the memory are deleted, whereas the current random access image may not be deleted. Thus, every time the at least one view switching point occurs, a corresponding view switching image may be predicted with reference to the current random access image stored in the memory.

The multi-view video prediction apparatus 10 may generate a depth map between multi-view images. The multi-view video prediction apparatus 10 may generate the depth map indicating an inter-view depth for each respective base view image and additional view image corresponding to the same scene, from among base view images and additional view images. The multi-view video prediction apparatus 10 may encode and transmit the depth maps along with the base view image stream and the additional view image stream.

The multi-view video prediction apparatus 10 may include a central processor (not shown) for generally controlling the base view encoder 12 and the additional view encoder 14. Alternatively, the base view encoder 12 and the additional view encoder 14 may be controlled by respective processors (not shown) and the processors may cooperatively interact with each other so as to control an overall operation of the multi-view video prediction apparatus 10. Alternatively, the base view encoder 12 and the additional view encoder 14 may be controlled according to control of an external processor (not shown) of the multi-view video prediction apparatus 10.

The multi-view video prediction apparatus 10 may include at least one data storage unit (not shown) for storing data that is input to and output from the base view encoder 12 and the additional view encoder 14. The multi-view video prediction apparatus 10 may include a memory controller (not shown) for controlling input/output of data of a data storage unit (not shown).

A multi-view video prediction restoring apparatus for restoring the prediction encoded multi-view video image stream described with reference to FIGS. 1A and 1B and a multi-view video prediction restoring method will now be described with reference to FIGS. 2A through 3B below.

Figure 2A:
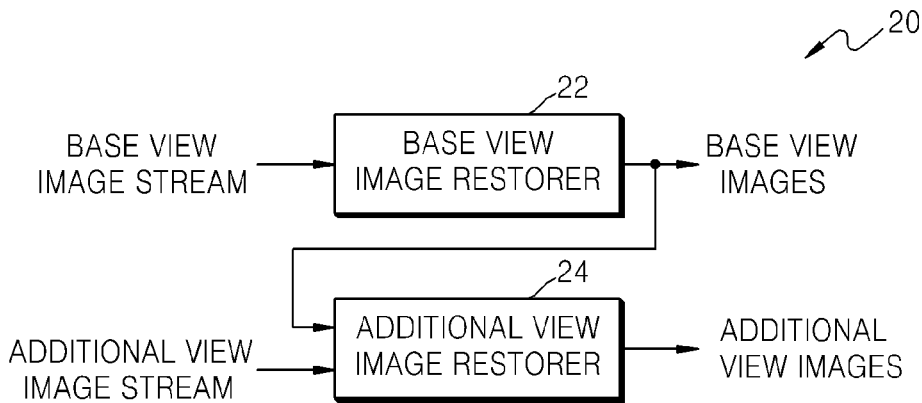
FIG. 2A is a block diagram of a multi-view video prediction restoring apparatus according to an exemplary embodiment.

FIG. 2A is a block diagram of a multi-view video prediction restoring apparatus 20 according to an exemplary embodiment.

The multi-view video prediction restoring apparatus 20 includes a base view image restorer 22 and an additional view image restorer 24.

The multi-view video prediction restoring apparatus 20 receives a base view image stream and an additional view image stream. When the multi-view video prediction restoring apparatus 20 receives encoded image streams of images according to views corresponding to a plurality of views according to scalable video coding, the multi-view video prediction restoring apparatus 20 may receive the base view image stream on which encoding data of base view images is recorded as a base layer image stream, and the additional view image stream on which encoding data of additional view images is recorded as an enhancement layer image stream.

The multi-view video prediction restoring apparatus 20 may decode the base view image stream and the additional view image stream to respectively restore base view images and additional view images. For example, center view images may be restored from the base view image stream, left view images may be restored from a first additional view image stream, and right view images may be restored from a second additional view image stream.

In the presence of three or more additional views, first additional view images about a first additional view, second additional view images about a second additional view, through $K_{th}$ additional view images about a $K_{th}$ additional view may be restored from a first additional view image stream, a second additional view image stream, through a $K_{th}$ additional view image stream, respectively.

The multi-view video prediction restoring apparatus 20 decodes each video image for each respective block. A block may be a maximum coding unit, a coding unit, a prediction unit, a transformation unit, or the like from among coding units according to a tree structure.

The multi-view video prediction restoring apparatus 20 may receive a motion vector generated by inter prediction and disparity information generated by inter-view prediction, along with the base view image stream and the additional view image stream including encoded data of the base view images and the additional view images.

The multi-view video prediction restoring apparatus 20 may perform motion compensation for referring to the same view images predicted via the inter prediction to restore images. The motion compensation refers to an operation of reconfiguring a restored image of a current image by synthesizing a reference image determined by using a motion vector of the current image and a residual of the current image.

The multi-view video prediction restoring apparatus 20 may perform disparity compensation with reference to the base view images in order to restore the additional view image predicted via inter-view prediction. The disparity compensation refers to an operation of reconfiguring the restored image of the current image by synthesizing a reference image determined by using disparity information of the current image and the residual of the current image.

The multi-view video prediction restoring apparatus 20 may perform disparity compensation for restoring the second additional view images predicted with reference to the first additional view images.

Images may be restored via inter motion compensation and inter-view disparity compensation based on a coding unit or a prediction unit.

The base view image restorer 22 decodes the received base view image stream and restores the base view images. In more detail, entropy decoding, inverse quantization, and inverse transformation may be performed on symbols that are extracted by parsing the base view image stream to restore residual values of the base view images.

The base view image restorer 22 may directly receive a bitstream of quantized transformation coefficients of the base view images. As a result of performing inverse quantization and inverse transformation on the quantized transformation coefficients, the residual values of the base view images may be restored. The base view image restorer 22 may restore the base view images via motion compensation referring to the base view images.

The base view image restorer 22 may decode the quantized transformation coefficients of base view anchor pictures that are I-picture type images of the base view image stream to restore the base view anchor pictures. The base view image restorer 22 may restore the base view key pictures that are I-picture type images from among the base view images without referring to different base view images. The base view image restorer 22 may restore pixels of blocks of the base view anchor pictures that are I-picture type images via intra prediction using peripheral pixels of a current block in the same picture.

The base view image restorer 22 may restore the base view images except for the base view anchor picture via motion compensation referring to different base view images. The base view image restorer 22 may restore the residual values of the base view images except for the base view anchor picture, determine a reference image from among the base view images, and compensate for the reference image by as much as the residual values to restore the base view images.

The additional view image restorer 24 decodes the additional view image stream to restore the additional view images. In more detail, entropy encoding, inverse quantization, and inverse transformation may be performed on symbols that are extracted by parsing the additional view image stream to restore residual values for each respective block. The additional view image restorer 24 may restore the residual values by directly receiving a bitstream of the quantized transformation coefficients of the residual values and performing inverse quantization and inverse transformation on the bitstream.

The additional view image restorer 24 may restore the additional view images via inter-view prediction referring to the base view images restored from the base view image stream and inter prediction referring to images of the same view in order to decode the additional view image stream.

The additional view image restorer 24 may restore the additional view images via inter-view disparity compensation referring to the base view images restored by the base view image restorer 22. With regard to a predetermined additional view, current additional view images may be restored via inter-view disparity compensation with reference to images of different additional views instead of the current additional view as well as the base view images.

The additional view image restorer 24 may perform motion compensation referring to additional view images of the same view to restore the additional view images. In particular, the additional view image restorer 24 may perform motion compensation referring to additional view anchor images of the same view.

The additional view image restorer 24 may restore the additional view images via disparity compensation referring to different view images and motion compensation referring to images of the same view, for the additional view images other than an anchor picture.

In more detail, the additional view image restorer 24 may decode the additional view image stream to obtain a motion vector of the additional view images except for the additional view anchor picture and a residual value. The additional view image restorer 24 may determine a reference image from among images of the same view by using the motion vector, and compensate for the reference image by as much as the residual value to restore the additional view images. A reference block may be determined from among reference blocks by using a motion vector of a current block of a current image.

In more detail, the additional view image restorer 24 may decode the additional view image stream to obtain disparity information of the additional view images except for the additional view anchor picture and a residual value. The additional view image restorer 24 may determine a reference image from among images of different views by using the disparity information, and compensate for the reference image by as much as the residual value to restore the additional view images.

However, the additional view image restorer 24 may restore the additional view anchor picture by performing disparity information referring to the base view anchor picture without performing motion compensation referring to different anchor pictures of the same view.

The additional view image restorer 24 may perform motion compensation with reference to only images except for an anchor picture having a preceding reproduction order among images of the same view when restoring the additional view images.

An operation of the multi-view video prediction restoring apparatus 20 will now be described in detail with reference to FIG. 2B below.

Figure 2B:
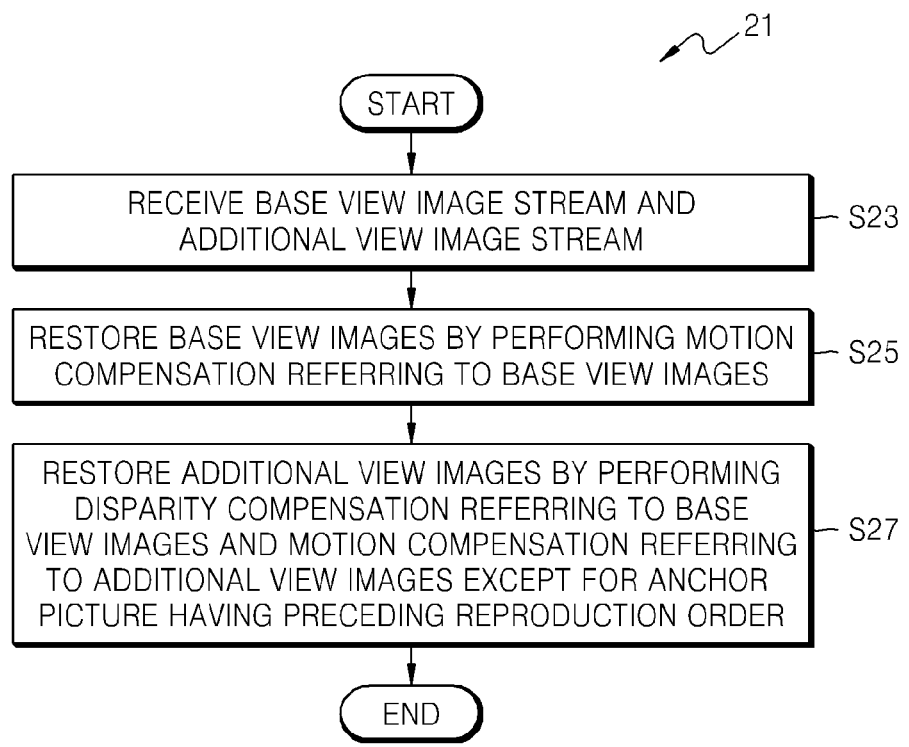
FIG. 2B is a flowchart of a multi-view video prediction restoring method performed by the multi-view video prediction restoring apparatus of FIG. 2A according to an exemplary embodiment.

FIG. 2B is a flowchart of a multi-view video prediction restoring method 21 performed by the multi-view video prediction restoring apparatus 20 of FIG. 2A according to an exemplary embodiment.

In operation S23, the multi-view video prediction restoring apparatus 20 may receive a base view image stream and additional view image streams for two or more additional views.

In operation S25, the base view image restorer 22 may use the base view image stream to perform motion compensation referring to base view images including base view anchor pictures that are I-picture type images and restore the base view images.

In operation S27, the additional view restorer 24 may use an image stream of a first additional view from among the additional view image streams to perform at least one of disparity compensation referring to the restored base view images and motion compensation referring to images of the first additional view and restore the images of the first additional view.

To restore motion information of the additional view images, only images except for an anchor picture having a preceding reproduction order among the images of the first additional view may be referred to. For example, among additional view anchor pictures of the same view adjacent to a current additional view image according to a reproduction order, an anchor picture positioned immediately prior to the current additional view image may not be used as a reference image.

For example, an anchor picture among the additional view images is a P-picture type image, and, for motion compensation for an additional view image that is a B-picture type image, the anchor picture that is the P-picture type image may be referred to. The additional view image restorer 24 may restore the additional view image that is the B-picture type image via motion compensation referring to an anchor picture having a later POC order but not referring to an anchor picture having a POC order preceding a POC order of the additional view image that is the B-picture type image.

The additional view image restorer 24 may perform motion compensation referring to an image that belongs to a current GOP and is restored before a current additional view image, but not referring to an image of the preceding POC order that belongs to a GOP previous to the current GOP to which the current additional view image belongs among the additional view images, to restore the current additional view image. For example, the additional view image restorer 24 may perform motion compensation on the current additional view image by referring to the anchor picture that belongs to the current GOP and having a POC order later than that of the current additional view image, but not referring to the image of the preceding POC order that belongs to the previous GOP.

According to another exemplary embodiment, the multi-view video prediction restoring apparatus 20 may use the received base view image stream and additional view image streams to restore a base view random access image that is an anchor picture at a randomly accessible additional view point and restore additional view random access images for respective additional views. The multi-view video prediction restoring apparatus 20 may store the base view random access image and the additional view random access images in a long-term memory.

According to another exemplary embodiment, the additional view image restorer 24 may perform motion compensation referring to a random access image of the first additional view to restore images of the first additional view. In this case, although a reproduction order of the random access image of the first additional view precedes that of a current image of the first additional view, the current image may be restored via motion compensation referring to the random access image of the first additional view.

The multi-view video prediction restoring apparatus 20 may generate a depth map indicating an inter-view depth between a base view image and an additional view image for the same scene, from among the base view images and the additional view images, along with the base view image stream and the additional view image streams. The additional view image restorer 24 may use the depth map between the base view image and the additional view image to restore the additional view image from the base view image.

Operations of the multi-view video prediction restoring apparatus 20 that performs view switching from the first additional view to the second additional view and restores the additional view images will now be described in detail with reference to FIGS. 3A and 3B below.

Figure 3A:
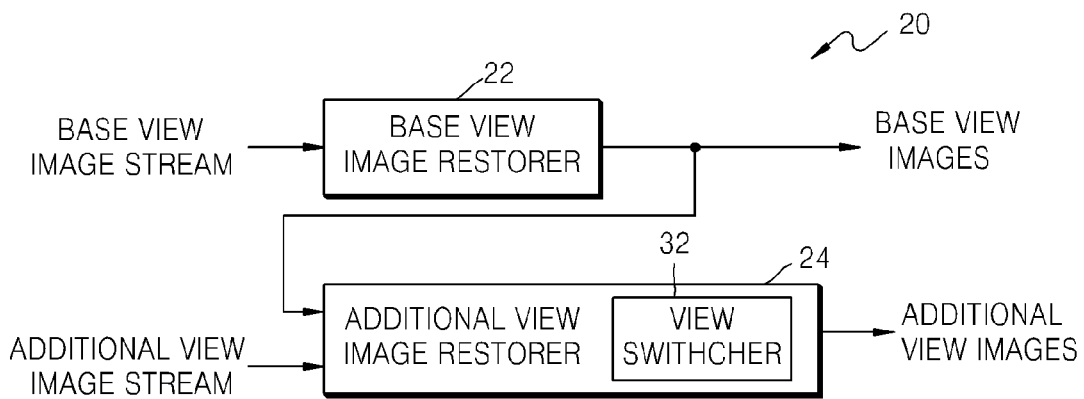
FIG. 3A is a detailed block diagram of the multi-view video prediction restoring apparatus of FIG. 2A according to another exemplary embodiment.

FIG. 3A is a detailed block diagram of the multi-view video prediction restoring apparatus 20 of FIG. 2A according to another exemplary embodiment.

The additional view image restorer 24 may include a view switcher 32. The additional view image restorer 24 may use a first additional view image stream to call the view switcher 32 if view switching occurs during restoration of first additional view images.

The view switcher 32 may use a second additional view image stream to restore second additional view images by starting an anchor picture of a second additional view in which view switching occurs and to which a POC is allocated.

An operation of the multi-view video prediction restoring apparatus 20 in which times are switched will now be described with reference to FIG. 3B below.

Figure 3B:
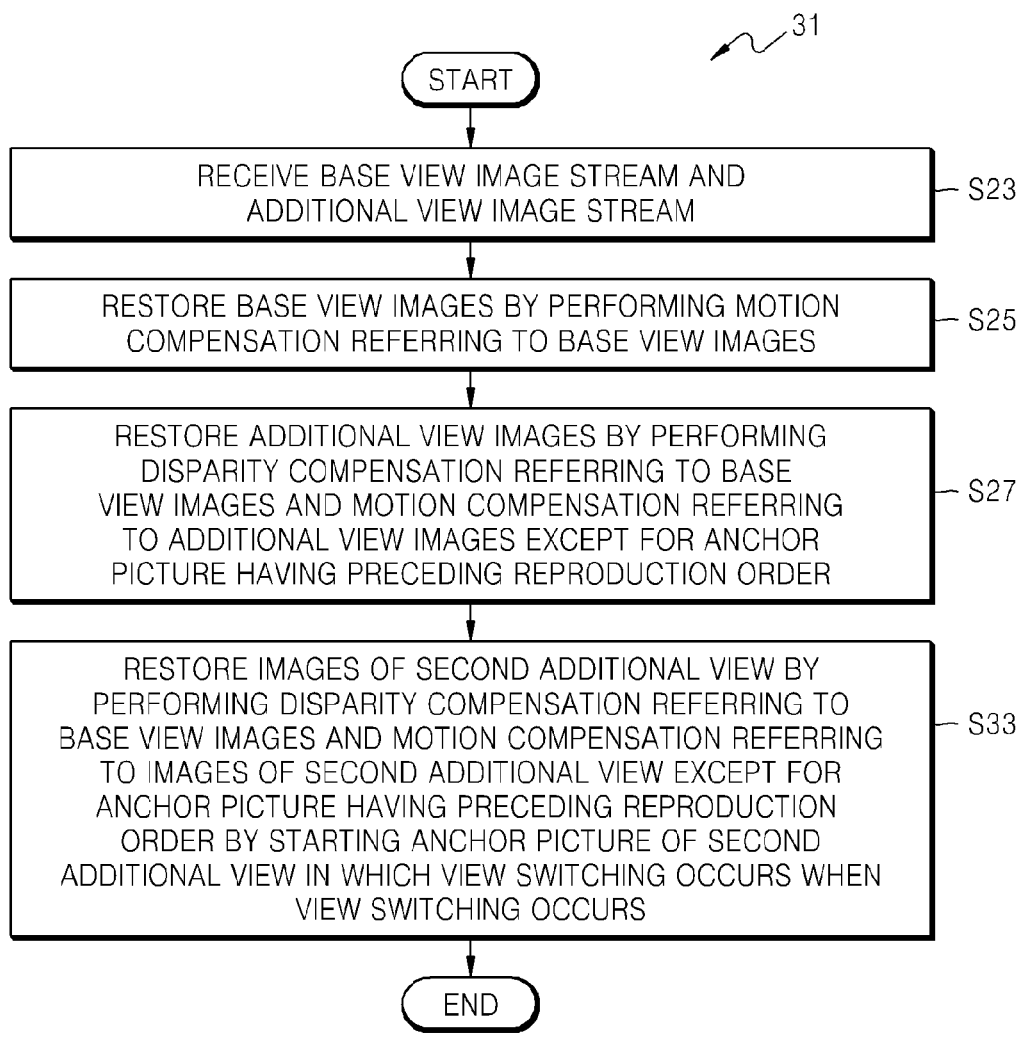
FIG. 3B is a flowchart of a multi-view video prediction restoring method performed by the multi-view video prediction restoring apparatus of FIG. 3A according to another exemplary embodiment.

FIG. 3B is a flowchart of a multi-view video prediction restoring method 31 performed by the multi-view video prediction restoring apparatus 20 of FIG. 3A according to another exemplary embodiment.

Operations 23, 25, and 27 are the same as described with reference to FIG. 2B above.

If view switching occurs while the additional view restorer 24 uses the image stream of the first additional view to restore the images of the first additional view in operation 27, operation 33 proceeds.

In operation 33, the view switcher 32 may start to restore images of a second additional view from an anchor picture of the second additional view to which a POC in which view switching occurs is allocated.

The view switcher 32 may perform at least one of disparity compensation referring to restored base view images and motion compensation referring to the images of the second additional view to restore the images of the second additional view.

The view switcher 32 may perform motion compensation referring to images except for an anchor picture having a preceding reproduction order among the images of the second additional view.

The view switcher 32 may not need to perform motion compensation referring to the anchor picture having a reproduction order preceding that of a current image although there is no anchor picture of the second additional view restored prior to a point at which view switching occurs. All reference images for motion compensation of the images of the second additional view positioned after the point at which view switching occurs may be restored, and thus the view switcher 32 may restore the images of the second additional view from a view switching time. Thus, although view switching occurs during restoration of additional view images, the additional view images may be restored by switching views without any decoding error or image loss.

The multi-view video prediction restoring apparatus 200 according to another exemplary embodiment that restores a base view random access image and additional view random access images for additional views to store the restored base view random access image and additional view random access images in a long-term memory may restore the additional view images by switching views without any decoding error or image loss even when view switching occurs during restoration of the additional view images.

That is, in operation 27, the additional view image restorer 24 according to another exemplary embodiment may perform motion compensation referring to a first additional view random access image stored in the long-term memory to restore the images of the first additional view. As described above, although a reproduction order of the first additional view random access image precedes that of a current image of the first additional view, since the first additional view random access image is stored in the long-term memory, the current image may be restored via motion compensation referring to the first additional view random access image.

In operation 33, the additional view image restorer 24 may call the view switcher 24 if view switching occurs to control the view switcher 24 to restore the images of the second additional view.

The view switcher 24 may perform motion compensation referring to a second additional view random access image stored in the long-term memory to restore the images of the second additional view. Although there is no anchor picture of the second additional view restored immediately before the point at which view switching occurs, motion compensation may be performed with reference to the second additional view random access image by not referring to the anchor picture having a preceding reproduction order immediately before the current image. Thus, reference images for motion compensation of the images of the second additional view positioned after the point at which view switching occurs may be obtained after all view switching points, and thus the images of the second additional view may be restored without any decoding error or image loss.

According to another exemplary embodiment, when random access images according to views are stored in the long-term memory, a random access image of a current random access point and a view switching image of a point at which views are switchable from the first additional view to the second additional view may be different from each other.

For example, among the base view images and the additional view images, random access points may be allocated to anchor pictures positioned according to a first POC cycle, and view switching points may be allocated to anchor pictures positioned according to a second POC cycle.

The first POC cycle is generally greater than the second POC cycle, the view switching point may pass more than once while the random access point passes once. Thus, a random access section from the current random access point to a next random access point may include the current random access point and at least one view switching point.

Therefore, every time the current random access point is generated and the view switching point is generated, since the current random access image is not deleted from among images stored in a reference image memory, the current random access image may be used as a reference image immediately after view switching occurs. The current random access image stored in the reference image memory may be deleted when the next random access point is generated.

The multi-view video prediction restoring apparatus 20 may include a central processor (not shown) for generally controlling the base view image restorer 22 and the additional view image restorer 24. Alternatively, the base view image restorer 22 and the additional view image restorer 24 may be controlled by respective processors (not shown) and the processors may cooperatively interact with each other so as to control an overall operation of the multi-view video prediction restoring apparatus 20. Alternatively, the base view image restorer 22 and the additional view image restorer 24 may be controlled according to control of an external processor (not shown) of the multi-view video prediction restoring apparatus 20.

The multi-view video prediction restoring apparatus 20 may include at least one data storage unit (not shown) for storing data that is input to and output from the base view image restorer 22 and the additional view image restorer 24. The multi-view video prediction restoring apparatus 20 may include a memory controller (not shown) for controlling input/output of data of a data storage unit (not shown).

The multi-view video prediction restoring apparatus 10 generates an additional view image stream according to a prediction structure in order not to refer to an anchor picture of a second additional view restored immediately before a current image, thereby enabling inter prediction although there is no anchor picture immediately before a point at which view switching occurs.

The multi-view video prediction restoring apparatus 20 does not need to refer to the anchor picture of the second additional view restored immediately before the current image although views are switched to the second additional view during restoration of images of a first additional view, thereby obtaining all reference images for motion compensation and restoring images of the second additional view without any decoding error or image loss.

A problem of a prediction structure will now be described in detail with reference to FIGS. 4A and 4B.

Figure 4A:
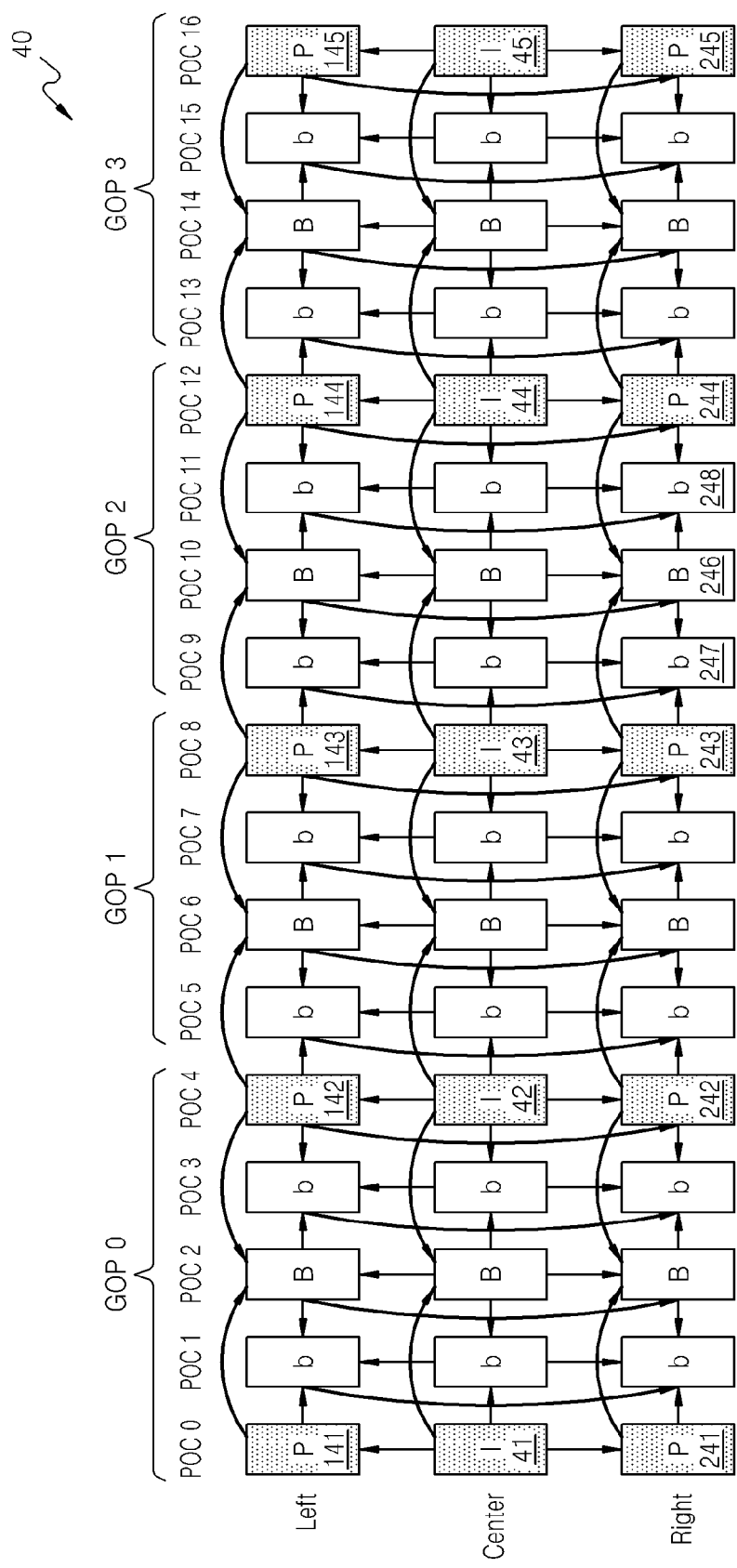
FIGS. 4A and 4B are diagrams of a reproduction order and a coding order of a multi-view video prediction structure, respectively.
Figure 4B:
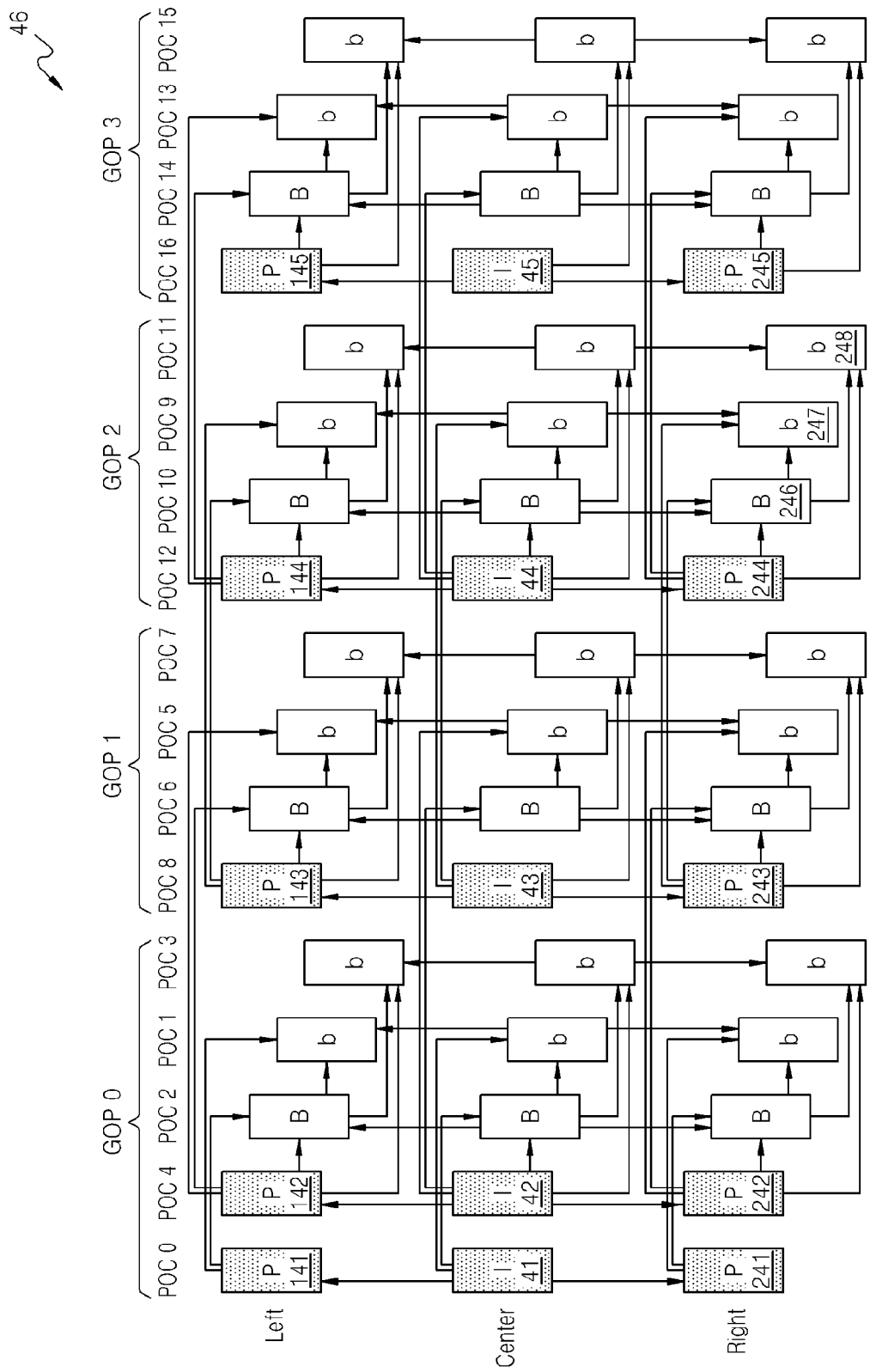

FIGS. 4A and 4B are diagrams of a reproduction order 40 and a coding order 46 of a multi-view video prediction structure, respectively.

According to the reproduction order 40 and the coding order 46 of the multi-view video prediction structure, images of the same view may be arranged in a horizontal direction. Thus, left view images "Left" may be arranged in a line in the horizontal direction, base view images "Center" may be arranged in a line in the horizontal direction, and right view images "Right" may be arranged in a line in the horizontal direction. The base view images may be center view images compared to the left and right view images.

Images having the same POC order may be arranged in a vertical direction. A POC of images is a reproduction order of images constituting video. "POC X" in the reproduction order 40 indicates a relative reproduction order of images positioned in a corresponding column. The smaller the number of X, the earlier the reproduction order, and the greater the number of X, the later the reproduction order.

Therefore, according to the reproduction order 40 of the multi-view video prediction structure, the left view images "Left" may be arranged in the horizontal direction according to the POC (reproduction order), the base view images "Center" may be in the horizontal direction according to the POC (reproduction order), and the right view images "Right" may be arranged in the horizontal direction according to the POC (reproduction order). The left and right view images positioned in the same column as that of the base view images have different views but have the same POC (reproduction order).

Four consecutive images of view images constitute a single GOP. Each GOP includes images between consecutive anchor pictures and a single key picture.

The anchor picture is a random access point. In this regard, when a predetermined reproduction position is selected from images that are arranged according to a reproduction order of video, that is, according to a POC, an anchor picture of which a POC is closest to the reproduction position is reproduced. The base view images include base view anchor pictures 41, 42, 43, 44, and 45, the left view images include left view anchor pictures 141, 142, 143, 144, and 145, and the right view images include right view anchor pictures 241, 242, 243, 244, and 245.

Multi-view images may be reproduced and predicted (restored) according to a GOP order. According to the reproduction order 40 of the multi-view video prediction structure, images included in a GOP 0 are reproduced according to views and then images included in a GOP 1 may be reproduced. That is, images included in each GOP may be reproduced in the order of GOP 0, GOP 1, GOP 2, and GOP 3. According to the reproduction order 40 of the multi-view video prediction structure, the images included in the GOP 0 are predicted (restored) according to views and then the images included in the GOP 1 may be predicted (restored). That is, the images included in each GOP may be reproduced in the order of GOP 0, GOP 1, GOP 2, and GOP 3.

According to the reproduction order 40 and the coding order 46 of the multi-view video prediction structure, both inter-view prediction and inter prediction may be performed on images. In the reproduction order 40, an image from which an arrow starts, and an image to which an arrow is directed is an image that is predicted by using the reference image.

In particular, according to the coding order 46 of the multi-view video prediction structure, images may be arranged in the horizontal direction according to a prediction (restoration) order of each image. That is, relatively left positioned images may be earlier predicted (restored) images, and relatively right positioned images may be later predicted (restored) images. Next images are predicted (restored) by referring to the earlier restored images, and thus all arrows indicating prediction directions between images of the same view may be directed to the relatively right positioned images from the relatively left positioned images.

A predicting result of the base view images may be encoded and then may be output in the form of a base view image stream, and a prediction result of the additional view images may be encoded and then may be output in the form of an additional view image stream. In addition, a predicting result of the left view images may be output in a first additional view image stream and a predicting result of the right view images may be output in a second additional view image stream.

Only inter prediction is performed on base view images. That is, the anchor pictures 41, 42, 43, 44, and 45 that are I-picture type pictures do not refer to different images, whereas the remaining images that are B-picture type images and b-picture type images are predicted with reference to different base view images. The B-picture type images are predicted with reference to an I-picture type anchor picture having a preceding POC order and an I-picture type anchor picture having a later POC order. B-picture type images are predicted with reference to an I-picture type anchor picture having a preceding POC order and a B-picture type image having a later POC order or a B-picture type image having a preceding POC order and an I-picture type anchor picture having a later POC order.

Inter-view prediction referring to different view images and inter prediction referring to the same view images are performed on the left view images and the right view images.

Like the base view images, inter prediction is also performed on the left view images and inter prediction is also performed on the right view images. The anchor pictures 141, 142, 143, 144, 145, 241, 242, 243, 244, and 245 from among the left view images and the right view images do not refer to the same view images, and the remaining images that are not anchor pictures are predicted with reference to the same view images.

However, since the anchor pictures 141, 142, 143, 144, 145, 241, 242, 243, 244, and 245 from among the left view images and the right view images are P-picture type images with reference to base view anchor pictures having the same POC order or different additional view anchor pictures.

The left view anchor pictures 141, 142, 143, 144, and 145 are P-picture type images predicted with reference to the base view anchor pictures 41, 42, 43, 44, and 45, respectively, having the same POC order. The right view anchor pictures 241, 242, 243, 244, and 245 are P-picture type images predicted with reference to the base view anchor pictures 41, 42, 43, 44, and 45, respectively, having the same POC order or the left view anchor pictures 141, 142, 143, 144, and 145.

Since inter-view prediction referring to different view images having the same POC order, as well as inter prediction, may be performed on the remaining images that are not the anchor pictures 141, 142, 143, 144, 145, 241, 242, 243, 244, and 245 from among the left view images and the right view images, the remaining images are B-picture type images or b-picture type images.

A restoration process for reproducing images is similar to a prediction process. However, each image may be restored by using a reference image only after the reference image of each image is restored.

First, base view images may be restored via inter prediction. If the base view anchor pictures 41, 42, 43, 44, and 45 that are I-picture type images are restored, base view images that are B-picture type images may be restored via motion compensation referring to the base view anchor pictures 41,

42, 43, 44, and 45. Base view images that are b-picture type images may be restored via motion compensation referring to I-picture type or B-picture type base view restoration images.

The left view images are encoded via inter-view prediction referring to the base view images and inter prediction referring to the left view images. Thus, after a reference image of a base view and a reference image of a left view are restored, the left view images may be restored via inter-view disparity compensation referring to the restored base view images and inter motion compensation referring to the restored reference image of the left view.

The right view images are encoded via inter-view prediction referring to the base view images and the left view images and inter motion compensation referring to the right view images. Thus, after a reference image of a base view, a reference image of a left view, and a reference image of a right view are restored, the right view images may be restored via inter-view disparity compensation referring to the reference image of the base view or the reference image of the left view and inter motion compensation referring to the restored reference image of the right view.

During a multi-view video decoding process, additional view images need to be restored by referring to base view images, and thus the base view images may be restored earlier than the additional view images. During restoration of the additional view images by referring to the restored base view images, view switching may occur. For example, view switching may occur in order to restore right view images during restoration of left view images.

As an example, it is assumed that view switching occurs after left view images from GOP 0 to GOP 1 are restored. Left view images need to be restored to GOP 1, and right view images need to be restored from GOP 2. However, since right view images of GOP 1 are not restored, and a right view anchor picture 243 of GOP 1 is not also restored, it is impossible to perform motion compensation on right view images 246 and 247 of GOP 2 predicted with reference to the right view anchor picture 243, and thus the right view images 246 and 247 may not be restored. The right view image 246 of GOP 2 that is a B-picture type image may not be restored, and thus a right view image 248 that is a b-picture type image predicted with reference to the right view image 246 may also not be restored. Thus, when inter prediction is performed by referring to an image that belongs to a previous GOP, images right after view switching occurs during a decoding process may not be completely restored. There is a problem in that among images that are to be restored immediately after view switching occurs, images predicted with reference to an anchor picture of a POC previous to a view switching point may not be restored.

Figure 5A:
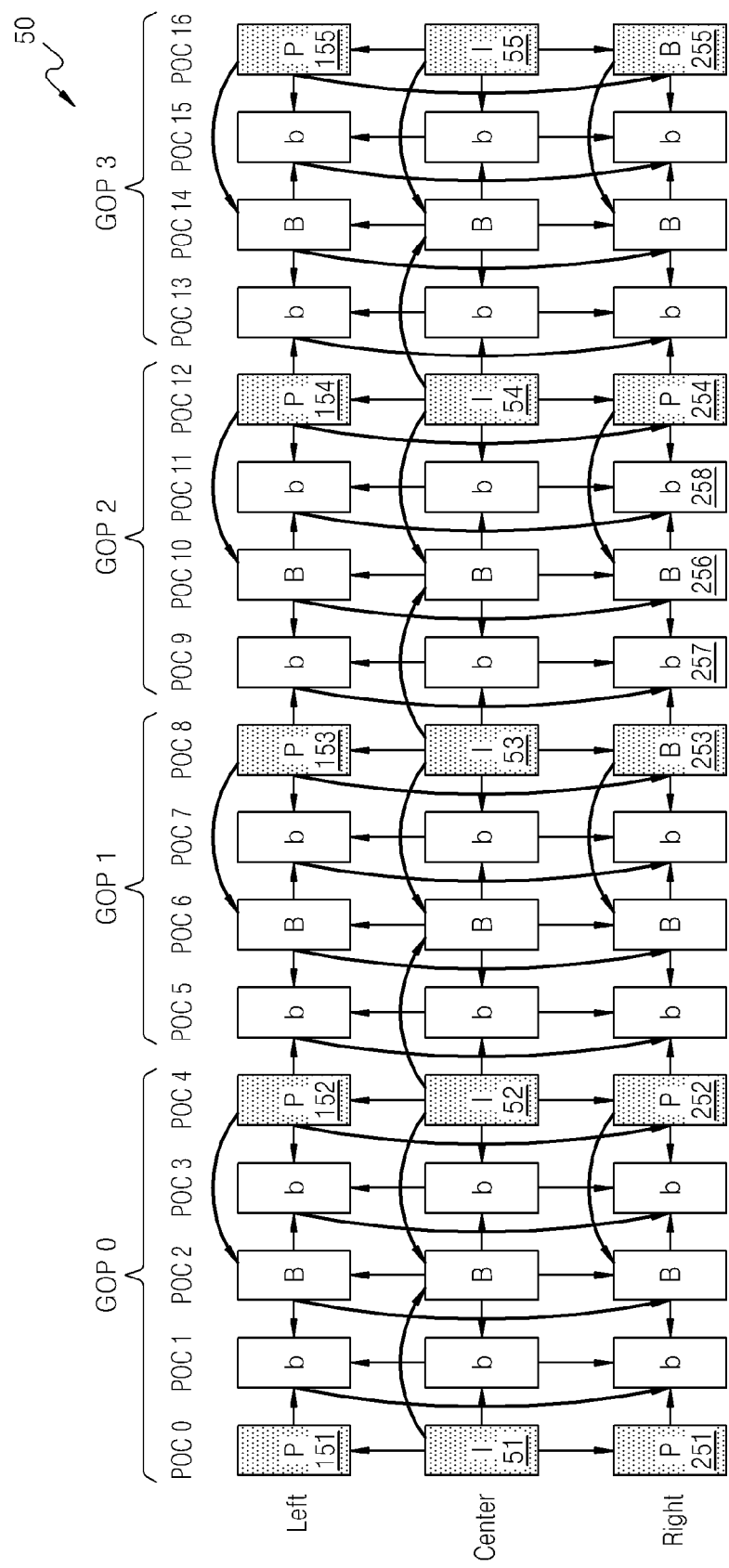
FIGS. 5A and 5B are diagrams of a reproduction order and a coding order of a multi-view video prediction structure, respectively, according to an exemplary embodiment.
Figure 5B:
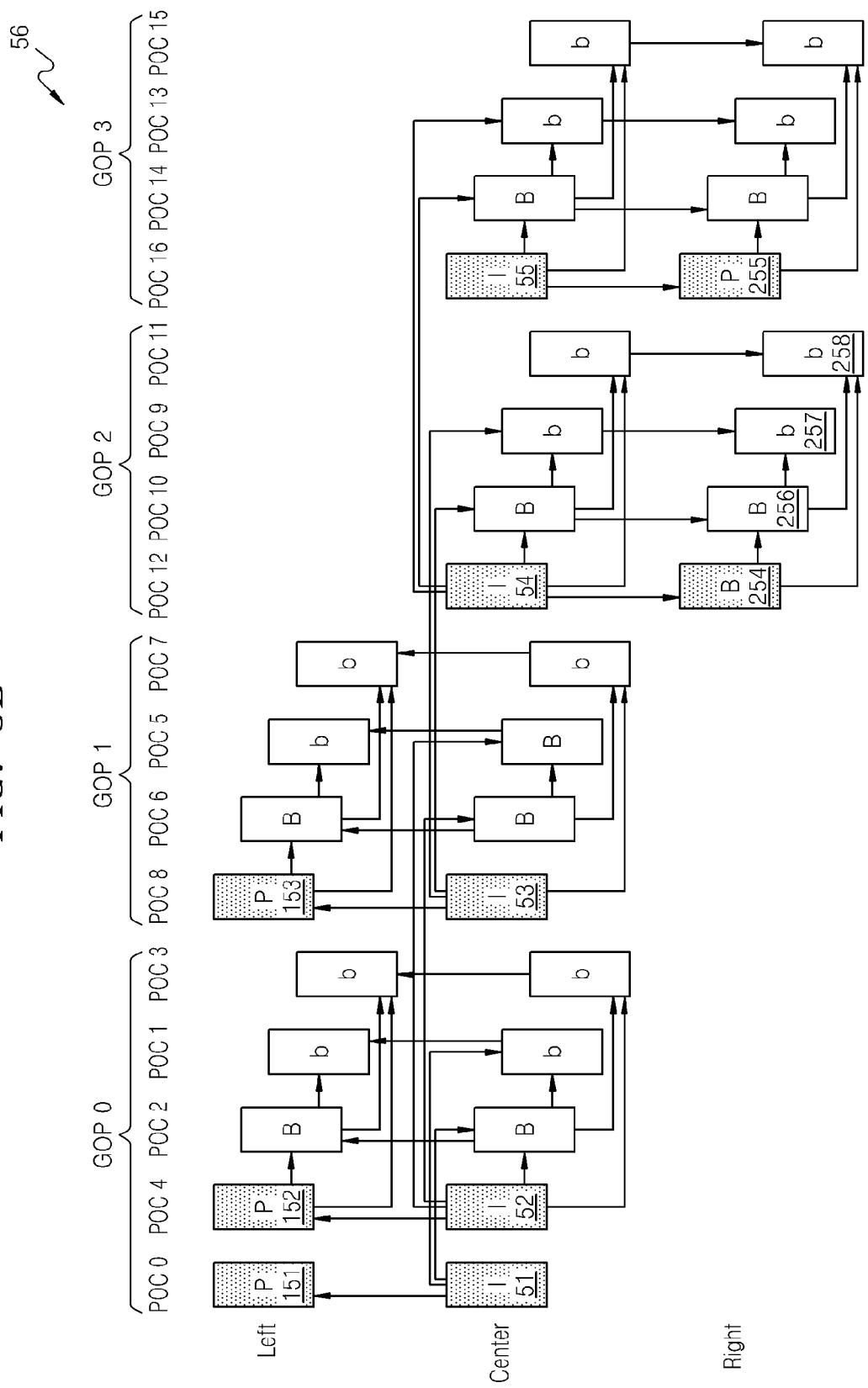

FIGS. 5A and 5B are diagrams of a reproduction order 50 and a coding order 56 of a multi-view video prediction structure, respectively, according to an exemplary embodiment.

The multi-view video prediction apparatus 10 may predict and encode base view images, left view images, and right view images according to the reproduction order 50 and the coding order 56 of the multi-view video prediction structure of FIGS. 5A and 5B.

A method of predicting the base view images is the same as described with reference to FIGS. 4A and 4B.

Inter-view prediction referring to different view images and inter prediction referring to same view images are respectively performed on the left view images and the right view images.

A method of predicting the left view images and the right view images is the same as described with reference to FIGS. 4A and 4B. Inter-view prediction may be performed on left view anchor pictures 151, 152, 153, 154, and 155 by referring to base view anchor pictures 51, 52, 53, 54, and 55 having the same POC order. Inter-view prediction may be performed on right view anchor pictures 251, 252, 253, 254, and 255 by referring to the base view anchor pictures 51, 52, 53, 54, and 55 having the same POC order or the left view anchor pictures 151, 152, 153, 154, and 155. Inter-view prediction referring to different view images having the same POC order may be performed on remaining images other than the anchor pictures 151, 152, 153, 154, 155, 251, 252, 253, 254, and 255 among the left view images and the right view images.

The multi-view video prediction structure of the multi-view video prediction apparatus 10 of FIGS. 5A and 5B is different from the multi-view video prediction structure of FIGS. 4A and 4B when inter prediction is performed on the left view images and the right view images.

The remaining images other than the anchor pictures 151, 152, 153, 154, 155, 251, 252, 253, 254, and 255 among the left view images and the right view images are predicted by referring to the same view images.

However, the left view images and the right view images may not be predicted by referring to an anchor picture having a preceding reproduction order among additional view images of the same view. That is, for inter prediction of a current left view image, the left view images except for a left view anchor picture having a reproduction order preceding that of the current left view image may be referred. Likewise, for inter prediction of a current right view image, the right view images except for a right view anchor picture having a reproduction order preceding that of the current right view image may be referred.

In addition, inter prediction of the current left view image may not refer to a left image that belongs to a GOP previous to a current GOP to which the current left view image belongs but may refer to a left view image that belongs to the current GOP and that is to be restored earlier than the current left view image. This applies the current right view image.

The multi-view video prediction restoring apparatus 20 may restore the base view images, the left view images, and the right view images according to the reproduction order 50 and the coding order 56 of the multi-view video prediction structure of FIGS. 5A and 5B.

A method of restoring the base view images is the same as described with reference to FIGS. 4A and 4B.

The left view images may be restored via disparity compensation referring to the same view images and inter motion compensation referring to the left view images. The right view images may be restored via inter-view disparity compensation referring to the base view images and the left view images and inter motion compensation referring to the right view images. Reference images need to be restored in advance so as to perform disparity compensation and motion compensation of the left view images and the right view images as described above.

A method of performing inter-view disparity compensation on the left view images and the right view images is the same as described with reference to FIGS. 4A and 4B.

For inter motion compensation of the left view images, the left view images may be restored via inter motion compensation referring to a restored reference image of a left view. For inter motion compensation of the right view images, the right view images may be restored via inter motion compensation referring to a restored reference image of a right view.

However, the left view images and the right view images may not use an anchor picture having a preceding reproduction order among additional view images of the same view as a reference image for motion compensation. That is, for inter motion compensation of a current left view image, the left view images except for a left view anchor picture having a reproduction order preceding that of the current left view image may be referred to. Likewise, for inter motion compensation of a current right view image, the right view images except for a right view anchor picture having a reproduction order preceding that of the current right view image may be referred to.

In addition, inter motion compensation of the current left view image may not refer to a left image that belongs to a previous GOP previous to a current GOP to which the current left view image belongs but may refer to a left view image that belongs to the current GOP and that is to be restored earlier than the current left view image. This applies to the current right view image.

Operations of the multi-view view prediction restoring apparatus 20 that restores base view images and additional view images according to the reproduction order 50 and the coding order 56 of the multi-view video prediction structure of FIGS. 5A and 5B when view switching occurs will be described later.

It is assumed that view switching occurs after left view images of GOP 0 and GOP 1 are restored. Left view images up to GOP 1 are restored, and right view images from GOP 2 are restored, and thus right view images of GOP 1 may not be restored. However, since right view images 256 and 257 of GOP 2 are not predicted by referring to the right view anchor picture 253 of GOP 1, although the right view images of GOP 1 are not restored, the right view images 256 and 257 of GOP 2 may be restored via motion compensation with reference to the right view anchor picture 254 of GOP 2 that is the same GOP. The right view image 256 of GOP 2 of a B-picture type is restored, and thus a right view image 258 of a b-picture type predicted with reference to the right view image 256 may be restored.

Therefore, the multi-view view prediction restoring apparatus 20 of FIGS. 5A and 5B does not perform motion compensation referring to an additional view image that belongs to a GOP previous to a current GOP, thereby restoring additional view images right after view switching occurs without a decoding error or loss although view switching occurs.

Figure 6A:
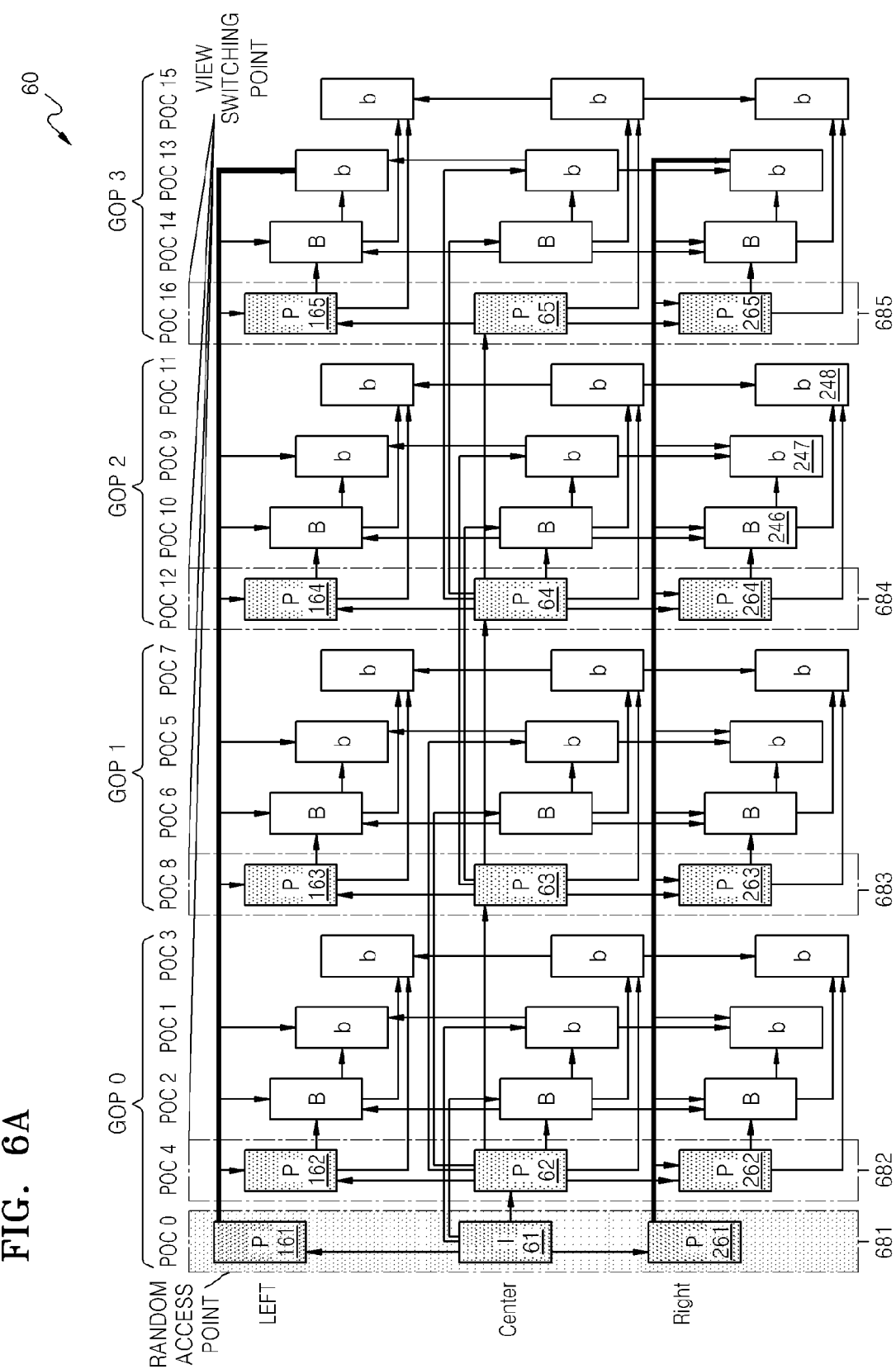
FIGS. 6A and 6B are diagrams of an overall reproduction order of a multi-view video prediction structure and a coding order when view switching occurs, respectively, according to another exemplary embodiment.
Figure 6B:
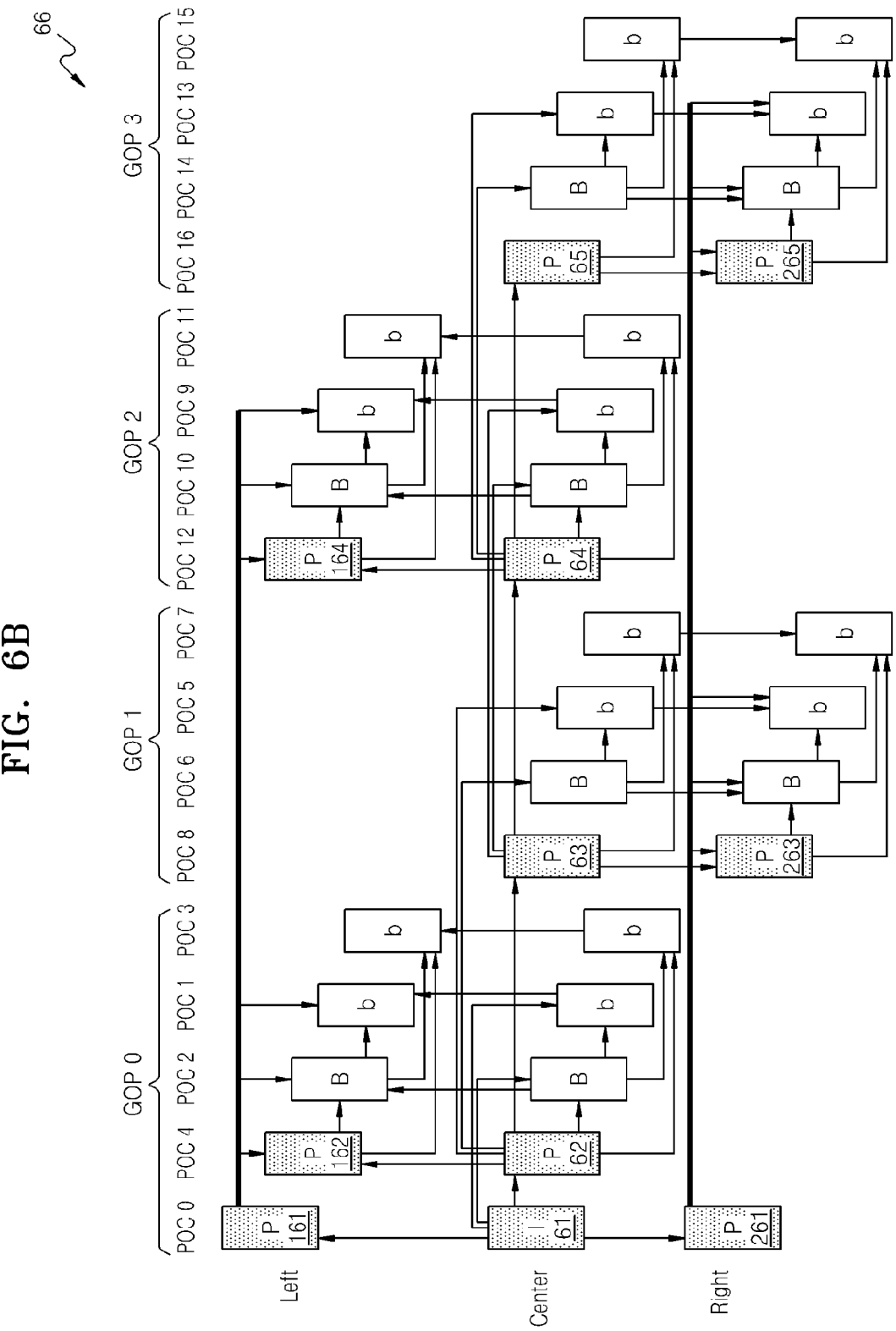

A method of performing inter prediction using a long-term memory in a multi-view video prediction structure will now be described in detail with reference to FIGS. 6A and 6B. FIGS. 6A and 6B are diagrams of an overall reproduction order 60 of a multi-view video prediction structure and a coding order 66 when view switching occurs, respectively, according to another exemplary embodiment.

The multi-view video prediction apparatus 10 according to another exemplary embodiment may predict and encode base view images, left view images, and right view images according to the reproduction order 60 of the multi-view video prediction structure. In particular, inter-view prediction between the base view images, the left view images, and the right view images according to the reproduction order 60 of the multi-view video prediction structure is not different from inter-view prediction in the multi-view video prediction structure described with reference to FIGS. 5A and 5B, and thus a description thereof is not repeated here.

The multi-view video prediction apparatus 10 according to another exemplary embodiment may store restored images that are allocated to a random access point 681 in a long-term memory. The multi-view video prediction apparatus 10 may restore an image allocated to the random access point 681, i.e., a random access image 61, during encoding of the base view images, and then store the restored random access image 61 in the long-term memory. The multi-view video prediction apparatus 10 may restore all images of different additional views allocated to the random access point 681, i.e., a left view random access image 161 and a right view random access image 261, and store the restored images in the long-term memory while storing the random access image 61 of a base view.

According to the reproduction order 60 of the multi-view video prediction structure, when inter prediction is performed according to views, the random access images 61, 161, and 261 stored in the long-term memory may be used as reference images.

The random access image 61 is an I-picture type image among the base view images, and the remaining anchor pictures 62, 63, 64, and 65 may be P-picture type images predicted with reference to the random access image 61. The base view images may be predicted by referring to an anchor picture of a preceding POC order that belongs to a previous GOP as well as an anchor picture that belongs to a current GOP. The P-picture type image 62, a B-picture type image, and a first b-picture type image of GOP 0 may refer to the random access image 61. The P-picture type image 63, a B-picture type image, and a first b-picture type image of GOP 1 may refer to the P-picture type image 62 of GOP 0.

The random access images 161 and 261 stored in the long-term memory may be respectively used as reference images of the left view images and the right view images in a random access section between the current random access point 681 to a next random access point, for inter prediction of the left view images and the right view images.

That is, the left view random access image 161 stored in the long-term memory may be used as a reference image of a P-picture type image 162, a B-picture type image, and a first b-picture type image of GOP 0, a P-picture type image 163, a B-picture type image, and a first b-picture type image of GOP 1, a P-picture type image 164, a B-picture type image, and a first b-picture type image of GOP 2, and a P-picture type image 165, a B-picture type image, and a first b-picture type image of GOP 3.

Likewise, the right view random access image 261 stored in the long-term memory may be used as a reference image of P-picture type images 262, 263, 264, and 265, B-picture type images, and first b-picture type images of GOP 0, GOP 1, GOP 2, and GOP 3.

A multi-view video prediction restoring process according to the reproduction order 60 of the multi-view video prediction structure is also similar to the multi-view video prediction process.

If the random access point 681 is generated, the base view random access image 61, the left view random access image 161, and the right view random access image 261 may be wholly restored and stored in the long-term memory. The random access images 61, 161, and 261 stored in the long-term memory may not be deleted until a next random access point is generated.

Therefore, for motion compensation of the base view images, the P-picture type image 62, a B-picture type image, and a first b-picture type image of GOP 0 may be restored by referring to the base view random access image 61 stored in the long-term memory, and the P-picture type image 63, a B-picture type image, and a first b-picture type image of GOP 1 may be restored by referring to the P-picture type image 62 of GOP 0. The base view images may be sequentially restored according to the coding order 60.

For motion compensation of the left view images, the left view random access image 161 stored in the long-term memory may be used as a reference image for the P-picture type image 162, the B-picture type image, and the first b-picture type image of GOP 0, the P-picture type image 163, the B-picture type image, and the first b-picture type image of GOP 1, the P-picture type image 164, the B-picture type image, and the first b-picture type image of GOP 2, and the P-picture type image 165, the B-picture type image, and the first b-picture type image of GOP 3.

Similarly, for motion compensation of the right view images, the right view random access image 261 stored in the long-term memory may be used as a reference image for the P-picture type image 262, the B-picture type image, and the first b-picture type image of GOP 0, the P-picture type image 263, the B-picture type image, and the first b-picture type image of GOP 1, the P-picture type image 264, the B-picture type image, and the first b-picture type image of GOP 2, and the P-picture type image 265, the B-picture type image, and the first b-picture type image of GOP 3.

The left and right view random access images 161 and 261 currently stored in the long-term memory are not deleted until the random access section is renewed, and thus the left and right view random access images 161 and 261 may be used as reference images of the left and right view images in a current random access section.

In the multi-view video prediction restoring apparatus 20 according to another exemplary embodiment, a structure used to allow view switching to efficiently occur according to the coding order 66 of the multi-view video prediction structure of FIG. 6A will be described later.

The multi-view video prediction restoring apparatus 20 according to another exemplary embodiment may set a random access point 681 and view switching points 682, 683, 684, and 685 at which views are switchable from a left view to a right view or from the right view to the left view to be separated from each other.

A view switching point may be more frequent than a random access point, and thus a first POC cycle of the random access point may be greater than a second POC cycle of the view switching point. Thus, a random access section that starts at the current random access point 681 may include the one random access point 681 and the one or more view switching points 682, 683, 684, and 685 according to views.

For example, among the base view images and additional view images, a random access point may be allocated to each anchor picture positioned according to the first POC cycle, and a view switching point may be allocated to each anchor picture positioned according to the second POC cycle.

Therefore, the left view random access image 161 restored at the random access point 681 and the left view anchor pictures 162, 163, 164, and 165 restored at the view switching points 682, 683, 684, and 685 may be determined as separate images. Likewise, the right view random access image 261 restored at the random access point 681 and the right view anchor pictures 262, 263, 264, and 265 restored at the view switching points 682, 683, 684, and 685 may be determined as separate images.

A restored image that may be a reference image of another image for inter prediction may be stored in a reference memory. The current random access images 61, 161, and 261 used as reference images may be stored in the long-term memory during the random access section. During the random access section, the current random access images 61, 161, and 261 are stored in the long-term memory and are not deleted. During the random access section, images stored in the long-term memory are deleted every time the view switching points 682, 683, 684, and 685 are generated, whereas the current random access images 61, 161, and 261 are not deleted. Thus, every time the one or more view switching points 682, 683, 684, and 685 are generated, motion compensation may be performed on a corresponding view switching by referring to the current random access images 61, 161, and 261 stored in the long-term memory.

Therefore, the left view anchor pictures 162, 163, 164, and 165 that are initially restored immediately after the view switching points 682, 683, 684, and 685 may be restored via motion compensation referring to the left view random access image 161. Likewise, the right view anchor pictures 262, 263, 264, and 265 that are initially restored immediately after the view switching points 682, 683, 684, and 685 may be restored via motion compensation referring to the right view random access image 261.

The multi-view video prediction restoring apparatus 20 according to another exemplary embodiment separates the random access point 681 and the view switching points 682, 683, 684, and 685, thereby efficiently performing view switching during restoration of the left view images or the right view images.

In particular, according to the coding order 66 of FIG. 6B, random access points may be generated every 16 frames, and view switching may be generated every 4 frames. The view switching points 682, 683, 684, and 685 may be set as points at which GOPs 0, 1, 2, and 3 are changed.

Therefore, although views are switched from a left view to a right view or from the right view to the left view at the view switching points 682, 683, 684, and 685, the anchor pictures 263, 264, and 265 that are initially restored immediately after the view switching points 682, 683, 684, and 685 may be restored via motion compensation that does not refer to images of the same view of a previous GOP that are not restored but refers to the left view random access image 161 or the right view random access image 261 that is stored in the long-term memory.

Therefore, according to the coding orders 60 and 66 of the multi-view video prediction structure of FIGS. 6A and 6B, the multi-view video prediction restoring apparatus 20 according to another exemplary embodiment may perform motion compensation by referring to additional view random access images stored in the long-term memory so as to restore the additional view images, thereby restoring the additional view images immediately after view switching occurs without any decoding error or loss although view occurs at points at which GOPs are changed.

A multi-view video prediction restoring method 70 of preventing a decoding error or loss of additional view images restored immediately after view switching occurs although view switching is performed by receiving a base view image stream and an additional view image stream predicted according to the multi-view video prediction structure of FIGS. 4A and 4B and restoring the additional view images will now be described in detail with reference to FIGS. 7A and 7B below.

Figure 7A:
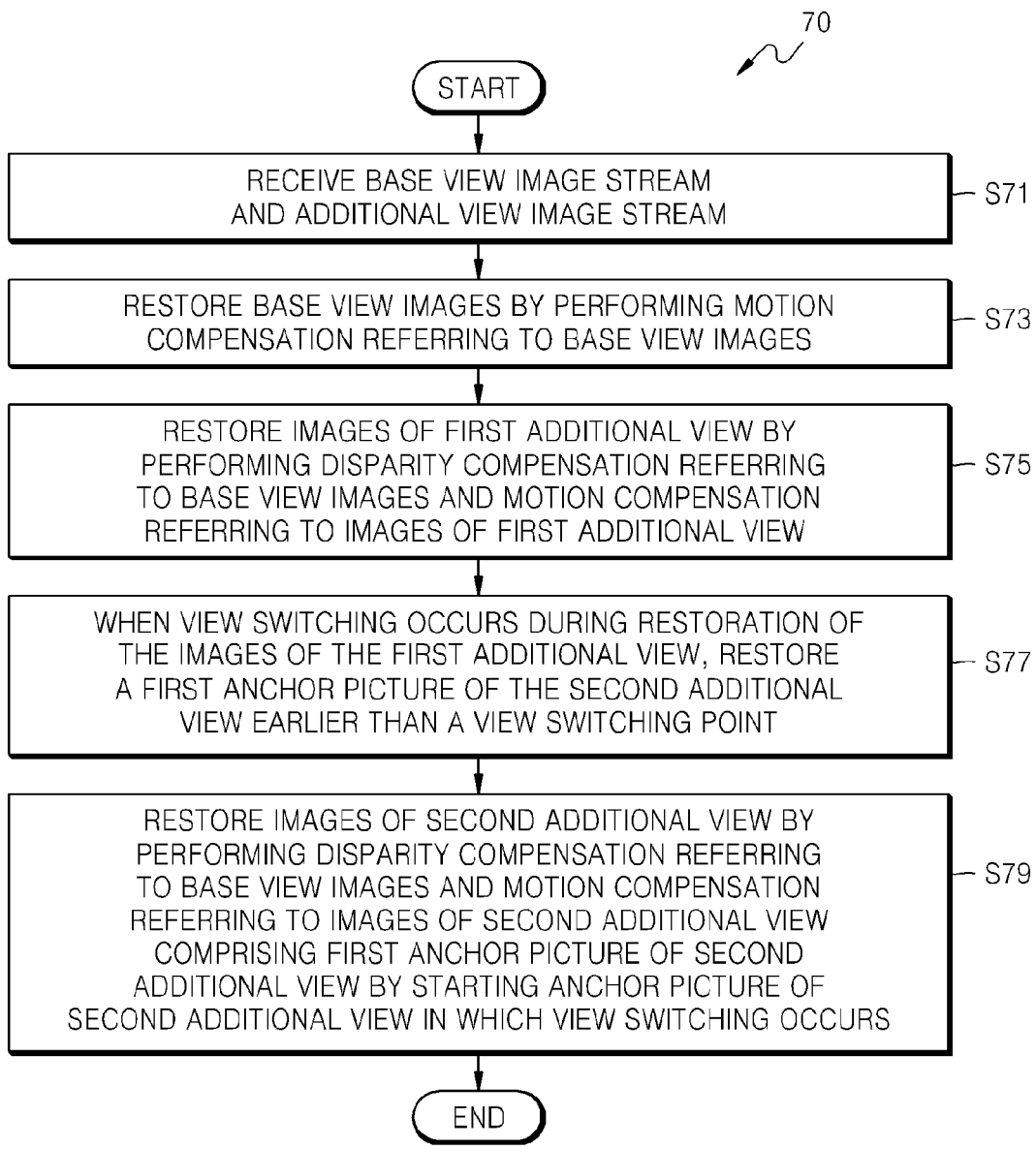
FIG. 7A is a flowchart of a multi-view video prediction restoring method according to another exemplary embodiment.

FIG. 7A is a flowchart of the multi-view video prediction restoring method 70 according to another exemplary embodiment. FIG. 7B is a diagram of a coding order 76 of a multi-view video prediction structure according to the multi-view video prediction restoring method 70 of FIG. 7A.

Operations S71 and S73 respectively correspond to operations S23 and S25 of FIG. 3B. In operation S71, a base view image stream and additional view image streams for two or more additional views are received. In operation S73, the base view image stream is used to perform motion compensation referring to base view images, and thus the base view images may be restored.

In operation S75, an image stream of a first additional view among the additional view image streams may be used to restore images of a first additional view. The images of the first additional view may be restored by performing at least one of disparity compensation referring to the base view images restored in operation S73 and motion compensation referring to the images of the first additional view.

In this case, motion compensation is performed on the images of the first additional view predicted according to the multi-view video prediction structure of FIGS. 4A and 4B, and thus motion compensation referring to an image that belongs to a previous GOP may be performed on a B-picture type image or a first b-picture type image of each GOP.

Therefore, if view switching may occur at points where GOPs are changed, to restore an image immediately after view switching occurs, motion compensation referring to an anchor picture of a POC previous to a view switching point needs to be performed. In the coding order 76 of the multi-view video prediction structure of FIG. 7B, when view switching occurs such that right view images may be restored at a point where left view images are restored to GOP 1 and then changed to GOP 2, a reference image for motion compensation of right view images of GOP 2 is the right view anchor picture 243 of GOP 1.

In operation S77, when view switching occurs during restoration of the images of the first additional view, an image steam of a second additional view may be used to restore a first anchor picture of the second additional view earlier than a view switching point.

Figure 7B:
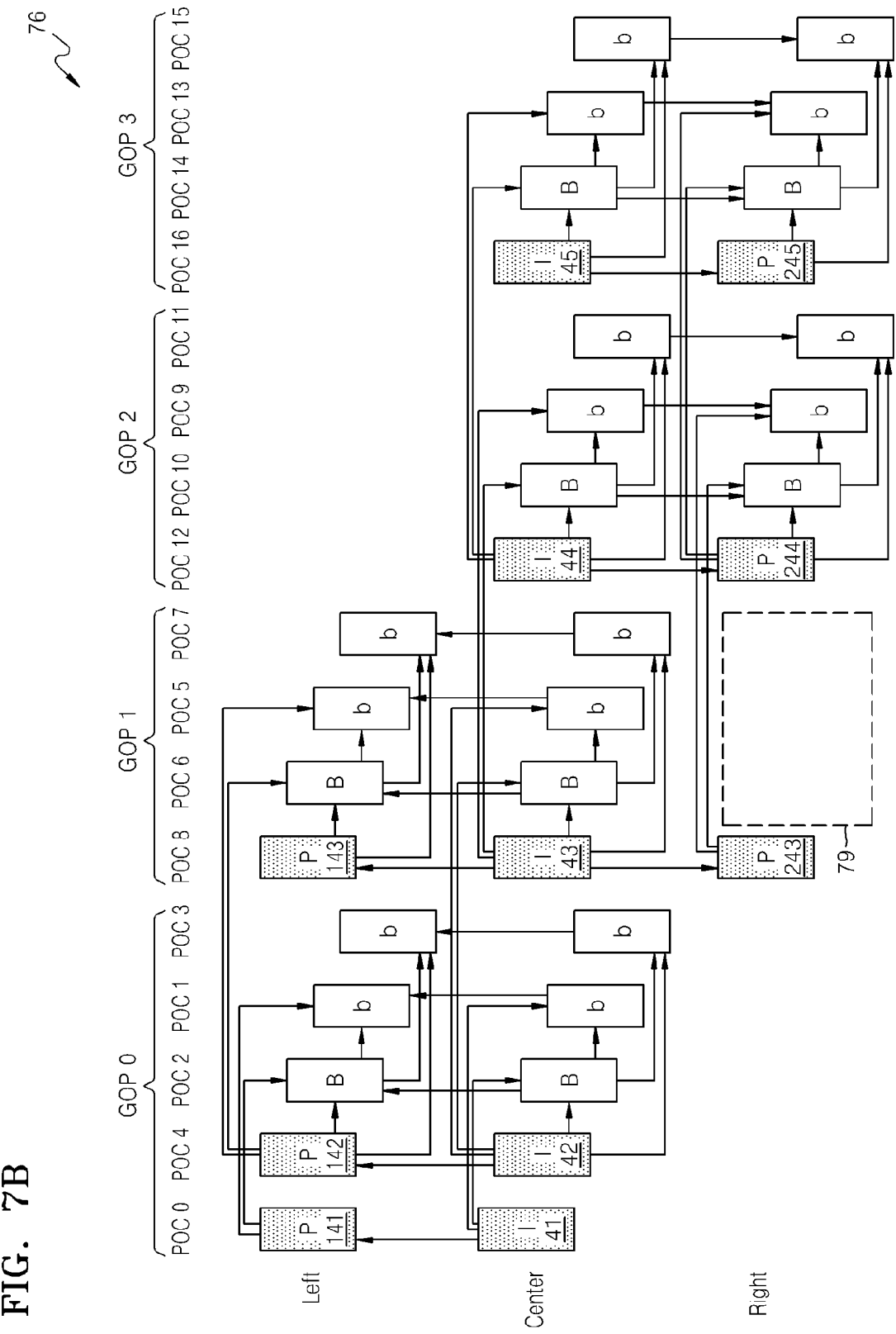
FIG. 7B is a diagram of a coding order of a multi-view video prediction structure according to the multi-view video prediction restoring method of FIG. 7A.

In the coding order 76 of the multi-view video prediction structure of FIG. 7B, when view switching occurs at a point where there is a change from GOP 1 to GOP 2, although the left view images of GOP 1 were previously restored in operation S75, the right view anchor picture 243 of GOP 1 may be restored. That is, GOP 1 immediately before view switching occurs may be a redundancy decoding section 79 in which the left view images and the right view anchor picture 243 are restored. However, the restoring of remaining right view images of the decoding section 79, except for the right view anchor picture 243 of GOP 1, may be omitted.

In operation S79, images of the second additional view are restored at the view switching point. The images of the second additional view may be restored by performing at least one of disparity compensation referring to the base view images and motion compensation referring to the images of the second additional view including the previously restored first anchor picture, starting from a second anchor picture of the second additional view of the view switching point.

In the coding order 76 of the multi-view video prediction structure of FIG. 7B, the right view anchor picture 243 of GOP 1 is restored in operation S77, images of a B-picture type of GOP 2 may be restored without a decoding error or loss via motion compensation referring to the right view anchor picture 243 of GOP 1.

Methods of predicting and restoring additional view images according to a prediction structure in which a current image does not refer to an anchor picture of a second additional view for inter prediction which is restored immediately before the current image, by using the multi-view video prediction apparatus 10 and the multi-view video restoring apparatus 20 according to various exemplary embodiments, are described with reference to FIGS. 1A through 7B above. Accordingly, although view switching occurs from a first additional view to the second additional view during restoration of images of the first additional view, there is no need to refer to the anchor picture of the second additional view restored immediately before the current image, thereby restoring the images of the second additional view without any decoding error or loss.

The multi-view video prediction apparatus 10 for performing the multi-view video prediction method 11 of FIG. 1B may perform intra prediction, inter prediction (inter-view prediction), transformation, and quantization for each respective image block to generate samples and may perform entropy encoding on the samples to output the samples in the form of a bitstream. As a video encoding result of the multi-view video prediction apparatus 10, that is, the multi-view video prediction apparatus 10 may cooperatively interact with an internal video encoding processor installed therein or an external video encoding processor in order to output a base view image stream and an additional view image stream, and thus, a video encoding process including transformation and quantization may be performed. The internal video encoding processor of the multi-view video prediction apparatus 10 may be embodied by adding a video encoding processing module to a video encoding device, a central operating device, or a graphic operating device as well as to a separate processor, which performs a basic video encoding operation.

The multi-view video prediction restoring apparatus 20 for performing the multi-view video prediction restoring methods 21 and 31 of FIGS. 2B and 3B may decode the received base view image stream and additional view image stream. That is, inverse quantization, inverse transformation, intra prediction, and motion compensation (or inter motion compensation or inter-view disparity compensation) may be performed on the base view image stream and the additional view image stream for each respective image block to restore samples of base view images from the base view image stream and to restore samples of additional view images from the additional view image stream. In order to output a restoration image generated as a decoding result of the multi-view video prediction restoring apparatus 20, the multi-view video prediction restoring apparatus 20 may cooperatively interact with an internal video encoding processor installed therein or an external video decoding processor, and thus, a video restoring operation including inverse quantization, inverse transformation, and prediction/restoration may be performed. The internal video decoding processor of the multi-view video prediction restoring apparatus 20 may be embodied by adding a video decoding processing module to a multi-view video restoring terminal, a central operating device, or a graphic operating device as well as to a separate processor, which performs a basic video restoring operation.

As described above, in the multi-view video prediction apparatus 10 and the multi-view video prediction restoring apparatus 20, blocks obtained by splitting video data are split into coding units according to a tree structure, and coding units, prediction units, and transformation units are used for inter-view prediction or inter prediction for a coding unit. Hereinafter, with reference to FIGS. 8 through 20, a method and apparatus for encoding a video and a method and apparatus for decoding a video, based on a coding unit and a transformation unit according to a tree structure will be described.

In principle, during encoding/decoding for multi-view video, encoding/decoding processes for a base view and encoding/decoding processes for an additional view are separately performed. That is, when inter-view prediction is performed on a multi-view video, encoding/decoding results of a single-view video are referred to each other, but separate encoding/decoding processes are performed for respective single-view videos.

For convenience of description, since a video encoding process and a video decoding process based on a coding unit according to a tree structure, which will be described with reference to FIGS. 8 through 20, are performed on a single-view video, only inter prediction and motion compensation will be described. However, as described with reference to FIGS. 1A through 7B, inter-view prediction between base view images and additional view images and inter-view disparity compensation are performed.

Figure 8:
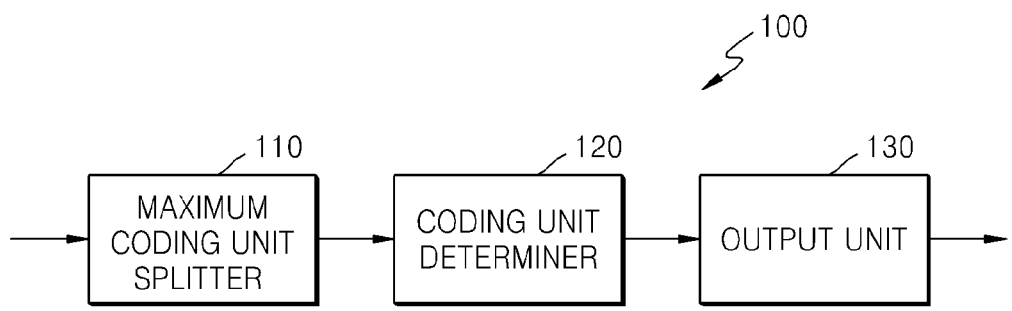
FIG. 8 is a block diagram of a video encoding apparatus based on coding units having a tree structure according to an exemplary embodiment.

When the multi-view video prediction apparatus 10 encodes a multi-view video based on a coding unit according to a tree structure, in order to encode a video for each respective single-view video, the multi-view video prediction apparatus 10 includes as many video encoding apparatuses 100 of FIG. 8 as the number of views of the multi-view video in order to encode a video such that each video encoding apparatus 100 may be controlled to encode an assigned single-view video. In addition, the multi-view video prediction apparatus 10 may perform inter-view prediction by using the encoding results of separate single-views of each video encoding apparatus 100. Thus, the multi-view video prediction apparatus 10 may generate a base view image stream and an additional view image stream, in which the encoding results for respective views are recorded, for each respective hierarchy.

Figure 9:
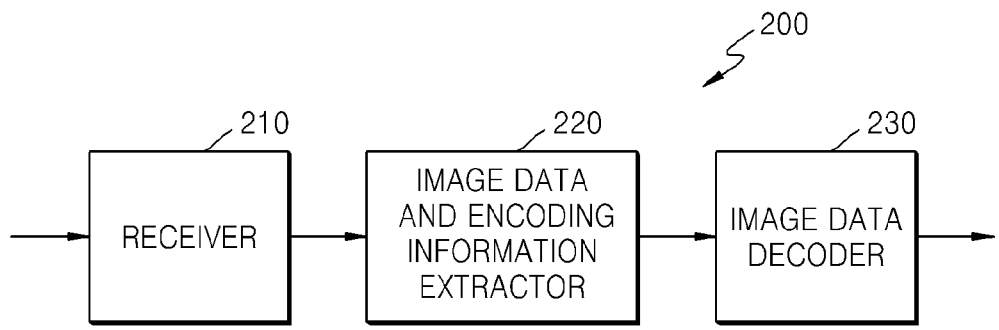
FIG. 9 is a block diagram of a video decoding apparatus based on coding units having a tree structure according to an exemplary embodiment.

Similarly, when the multi-view video prediction restoring apparatus 20 decodes a multi-view video based on a coding unit according to a tree structure, in order to decode the received base view image stream and additional view image stream for each respective layer, the multi-view video prediction restoring apparatus 20 may include as many video decoding apparatuses 200 of FIG. 9 as the number of views of the multi-view video and the video decoding apparatuses 200 may be controlled to perform decoding on single-view videos that are respectively assigned to the video decoding apparatuses 200. In addition, the multi-view video prediction restoring apparatus 20 may perform inter-view disparity compensation by using the decoding results of separate single-views of the multi-view video prediction restoring apparatuses 20. Thus, the multi-view video prediction restoring apparatus 20 may generate base view images and additional view images, which are restored for respective layers.

FIG. 8 is a block diagram of a video encoding apparatus 100 based on a coding unit according to a tree structure, according to an exemplary embodiment.

The video encoding apparatus 100 performs video prediction based on a coding unit according to a tree structure includes a maximum coding unit splitter 110, a coding determiner 120 and an output unit 130. Hereinafter, for convenience of description, the video encoding apparatus 100 that uses video prediction based on a coding unit according to a tree structure is referred to as 'the video encoding apparatus 100'.

The maximum coding unit splitter 110 may split a current picture based on a maximum coding unit for the current picture. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2.

A coding unit according to an exemplary embodiment may be characterized by a maximum size and a depth. The depth denotes a number of times the coding unit is spatially split from the maximum coding unit, and as the depth increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation is performed on all of the deeper coding units generated as the depth increases. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding on the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition is a data unit obtained by dividing the prediction unit of the coding unit and the prediction unit may be a partition having the same size as the coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a transformation unit that is different from the coding unit. In order to perform the transformation in the coding unit, the transformation may be performed based on a data unit having a size smaller than or equal to the coding unit. For example, the transformation unit for the transformation may include a transformation unit for an intra mode and a data unit for an inter mode.

Similarly to the coding unit according to the tree structure according to the exemplary embodiment, the transformation unit in the coding unit may be recursively split into smaller sized regions and residual data in the coding unit may be divided according to the transformation having the tree structure according to transformation depths.

According to an exemplary embodiment, the transformation unit of the coding unit is obtained by splitting the height and width of the coding unit and a transformation depth indicating the number of times splitting is performed may also be set in the transformation unit. For example, when the size of a transformation unit of a current coding unit is 2N×2N, a transformation depth may be set to 0. When the size of a transformation unit is N×N, the transformation depth may be set to 1. In addition, when the size of the transformation unit is N/2×N/2, the transformation depth may be set to 2. That is, the transformation unit according to the tree structure may also be set according to the transformation depth.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units and a prediction unit/partition according to a tree structure in a maximum coding unit, and a method of determining a transformation unit, according to an exemplary embodiment, will be described in detail later with reference to FIGS. 10 through 20.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit having a maximum size, which is included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bitstream, a sequence parameter set (SPS) or a picture parameter set (PPS).

In addition, information about a maximum size of a transformation unit and information about a minimum size of a transformation, which are acceptable for a current video, may also be output via a header of a bitstream, a SPS or a PPS. The output unit 130 may encode and output reference information, prediction information, and information about a slice type, which are related to prediction.

In the video encoding apparatus 100, the deeper coding unit may be a coding unit obtained by dividing a height or width of a coding unit of an upper depth, which is one level higher than the current depth, by two. In other words, when the size of the coding unit of the current depth is 2N×2N, the size of the coding unit of the lower depth is N×N. Also, the coding unit of the current depth having the size of 2N×2N may include a maximum value 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The multi-view video prediction apparatus 10 described with reference to FIG. 1A may include as many video encoding apparatuses 100 as the number of views in order to encode single-view images for respective views of a multi-view video. For example, the base view encoder 12 may include a single video encoding apparatus 100 and the additional view encoder 14 may include as many video encoding apparatuses 100 as the number of additional views.

When the video encoding apparatus 100 encodes base view images, the coding determiner 120 may determine a prediction unit for inter prediction for each respective coding unit according to a tree structure for each maximum coding unit and may perform inter prediction for each respective prediction unit.

When the video encoding apparatus 100 encodes additional view images, the coding determiner 120 may also determine a prediction unit and a coding unit according to a tree structure for each maximum coding unit and may perform inter prediction for each respective prediction unit.

In particular, the video encoding apparatus 100 for the additional view images may perform inter prediction that predicts the additional view images with reference to the additional view images except for an anchor picture having a preceding reproduction order among the additional view images of the same view.

The video encoding apparatus 100 for the additional view images may refer to an anchor picture having a later POC order but not to an anchor picture having a POC order preceding that of a current additional view image, for prediction on the additional view image other than the anchor picture.

Among the additional view images, except for an image of preceding POC order that belongs to a GOP previous to a current GOP to which the current additional view image belongs, the current additional view image may be predicted by referring to an image that belongs to the current GOP and is to be restored earlier than the current additional view image.

The video encoding apparatus 100 for the additional view images according to another exemplary embodiment may store a base view random access image that is an anchor picture of a randomly accessible point and additional view random access images according to views in a long-term memory.

In this case, inter prediction referring to the additional view random access images among the additional view images of the same view may be performed. Except for the anchor picture having the preceding reproduction order among the additional view images of the same view, the additional view images may be predicted by referring to the additional view random access images and remaining images. To this end, a current random access point and a view switchable point from a first additional view to a second additional view may be set to be separated.

Remaining images stored in the long-term memory are deleted every time at least one view switching point is generated, whereas the current random access image stored in the long-term memory may not be deleted. A corresponding view switching image may be predicted by referring to the current random access image stored in the long-term memory every time the at least one view switching point is generated.

FIG. 9 is a block diagram of a video decoding apparatus 200 based on a coding unit according to a tree structure, according to an exemplary embodiment.

The video decoding apparatus 200 based on the coding unit according to the tree structure includes a receiver 210, an image data and encoding information extractor 220, and an image data decoder 230. Hereinafter, for convenience of description, the video decoding apparatus 200 using video prediction based on a coding unit according to a tree structure will be referred to as the 'video decoding apparatus 200'.

Definitions of various terms, such as a coding unit, a depth, a prediction unit, a transformation unit, and information about various encoding modes, for decoding operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a SPS, or a PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bitstream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read transformation unit information according to a tree structure for each coding unit so as to determine transform units for each coding unit and perform inverse transformation based on transformation units for each coding unit for each maximum coding unit. Via the inverse transformation, a pixel value of a spatial region of the coding unit may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. For each coding unit determined as described above, information about an encoding mode may be obtained so as to decode the current coding unit.

The multi-view video prediction apparatus 10 described with reference to FIG. 1A may include as many image data decoders 230 of the image decoding apparatus 200 as the number of views in order to generate reference images for inter prediction for respective views of a multi-view video. For example, the base view encoder 12 may include a single image data decoder 230 and the additional view encoder 14 may include as many video decoding apparatuses 200 as the number of additional views.

In addition, the multi-view video prediction restoring apparatus 20 described with reference to FIGS. 2A and 2B may include as many video decoding apparatuses 200 as the number of views in order to decode the received base view image stream and additional view image stream to restore base view images and additional view images. For example, the base view decoder 22 may include a single video decoding apparatus 200 and the additional view decoder 24 may include as many video decoding apparatuses 200 as the number of additional views.

When a base view image stream is received, the image data decoder 230 of the video decoding apparatus 200 may split samples of base view images that are extracted from the base view image stream by the extractor 220 into coding units according to a tree structure of a maximum coding unit. The image data decoder 230 may perform motion compensation on respective prediction units for inter prediction for each respective coding unit according to a tree structure of the samples of the base view images, to restore the base view images.

When an additional layer image stream is received, the image data decoder 230 of the video decoding apparatus 200 may split samples of additional view images that are extracted from the additional layer image stream by the extractor 220 into coding units according to a tree structure of a maximum coding unit. The image data decoder 230 may perform motion compensation on respective prediction units for inter prediction of the samples of the additional view images to restore the additional view images.

In particular, the image data decoder 230 for images of a first additional view may perform at least one of disparity compensation referring to the restored base view images and motion compensation referring to images of the first additional view to restore the images of the first additional view.

For motion compensation of the images of the first additional view, the images except for anchor picture having preceding reproduction order among the images of the first additional view may be referred to. An additional view image that is a B-picture type image may be restored via motion compensation referring to an anchor picture having a later POC order except for an anchor picture having a POC order preceding that of the additional view image that is the B-picture type image.

A current additional view image may be restored by performing motion compensation referring to an image that belongs to a current GOP and is to be restored earlier than the current additional view image but not referring to an image of a preceding POC order that belongs to a GOP previous to the current GOP to which the current additional view image belongs.

If view switching occurs during restoration of the images of the first additional view, images of a second additional view may be restored from an anchor picture of the second additional view in which view switching occurs and that has a POC.

The images of the second additional view may be restored by performing at least one of disparity compensation referring to the restored base view images and motion compensation referring to the images of the second additional view. For motion compensation, the images except for an anchor picture having a preceding reproduction order among the images of the second additional view may be referred to. Thus, although view switching occurs during restoration of the additional view images, the additional view images may be restored by switching views without a decoding error or image loss.

The image data decoder 230 for an additional view image according to another exemplary embodiment may use the received base view image stream and additional view image stream to restore and store a base view random access image and additional view random access images in the long-term memory. In this case, the images of the first additional view may be restored by performing motion compensation referring to a random access image of the first additional view stored in the long-term memory.

When view switching occurs, although there is no anchor picture of the second additional view restored immediately before a view switching point, motion compensation may be performed by referring to a random access image of the second additional view by not referring to an anchor picture having a preceding reproduction order immediately before a current image. Thus, a reference image for motion compensation of the images of the second additional view immediately after the view switching point may be obtained, thereby restoring the images of the second additional view without a decoding error or image loss.

According to another exemplary embodiment, in a prediction structure in which a B-picture type image or a first b-picture type image of each GOP refers to an image that belongs to a previous GOP, when view switching occurs during restoration of the images of the first additional view, a first anchor picture of the second additional view previous to a view switching point may be restored. When view switching occurs at a point from GOP 1 to GOP 2, although the images of the first additional view of GOP 1 were restored in advance, the first anchor picture of the second additional view of GOP 1 may be restored. The images of the second additional view may be restored by performing at least one of disparity compensation referring to the base view images and motion compensation referring to the images of the second additional view including the previously restored first anchor picture, by starting a second anchor picture of the second additional view of the view switching point.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of a coding unit is determined considering a resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 10:
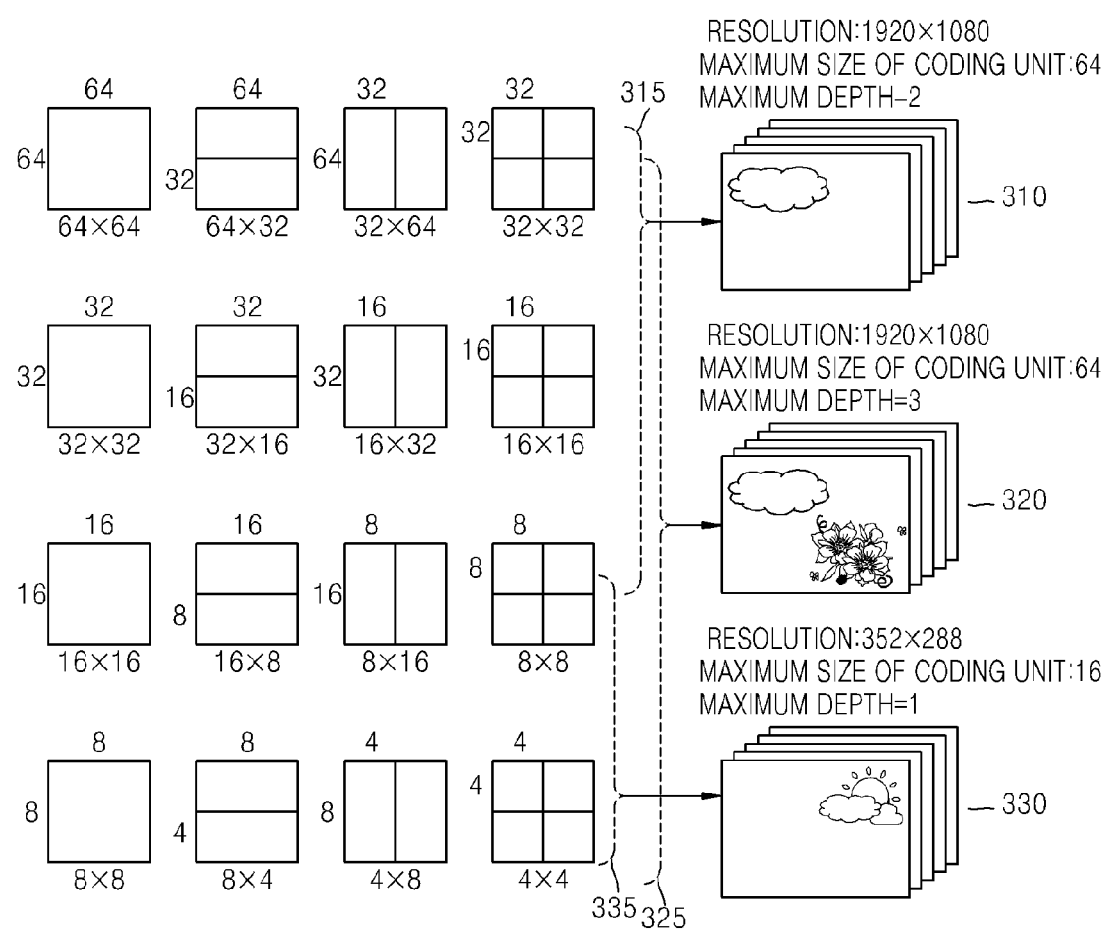
FIG. 10 is a diagram for describing a concept of coding units according to an exemplary embodiment.

FIG. 10 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are increased to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased to 3 layers by splitting the maximum coding unit three times. As a depth increases, detailed information may be precisely expressed.

Figure 11:
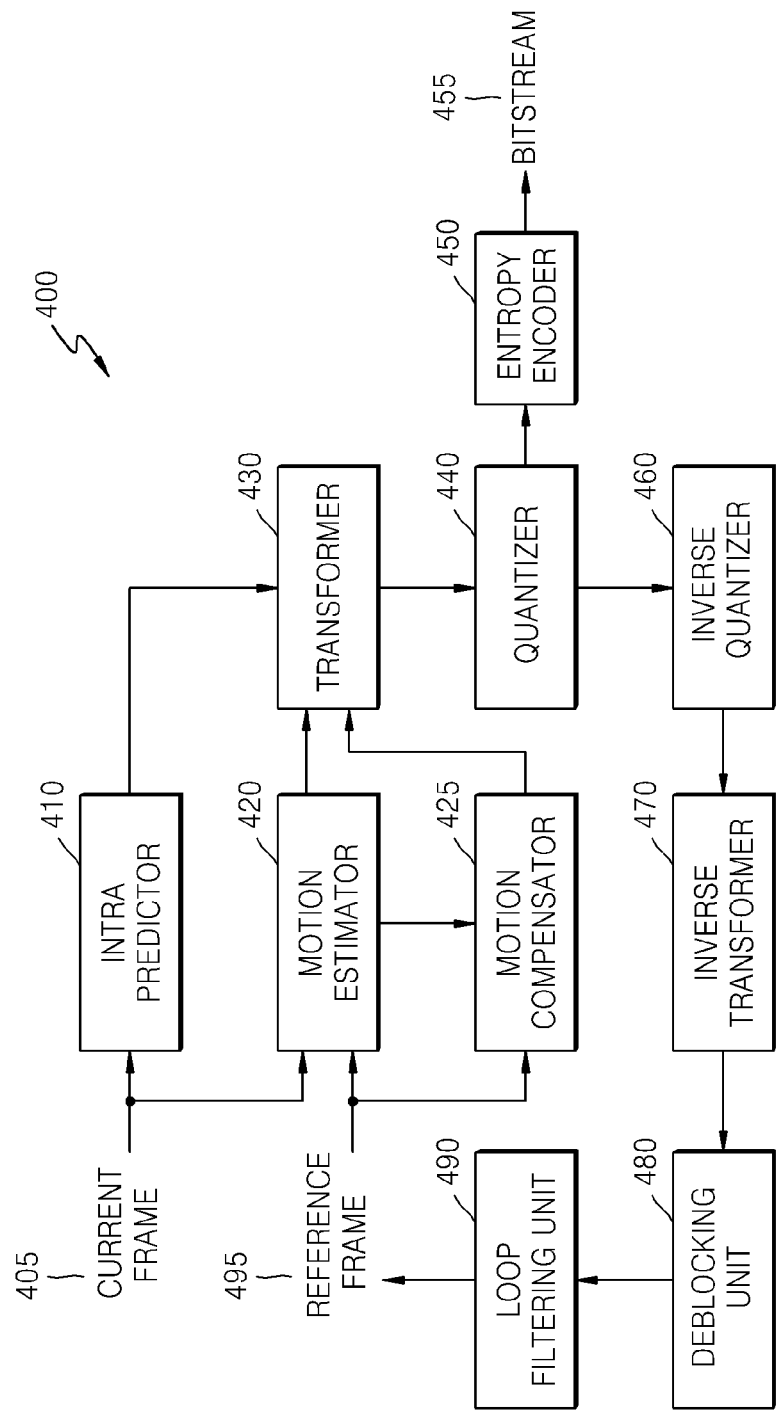
FIG. 11 is a block diagram of an image encoder based on coding units according to an exemplary embodiment.

FIG. 11 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as quantized transformation coefficients through a transformer 430 and a quantizer 440. The quantized transformation coefficients are restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficients may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

If the image encoder 400 encodes additional view images in a multi-view video structure, when the motion estimator 420 determines a prediction unit for inter prediction for each coding unit according to a tree structure for a maximum coding unit and perform inter prediction for each prediction unit, additional view anchor pictures may be predicted with reference to different anchor images of the same view. In addition, the image encoder 400 may generate depth maps in which a depth difference between base view images having the same POC order as the additional view images is recorded.

In addition, the motion compensator 425 may perform motion compensation for each respective prediction unit for inter prediction to restore the additional view images. The restored images of the additional view images may be used as reference images for inter prediction of the additional view images. When the current additional view key picture is restored, if the additional view anchor picture (reference anchor image) that is a reference image of the current additional view anchor picture is not restored, the current additional view anchor picture may be restored by using the base view anchor picture having the same POC order as the current additional view anchor picture and the depth map of the current additional view anchor picture.

Figure 12:
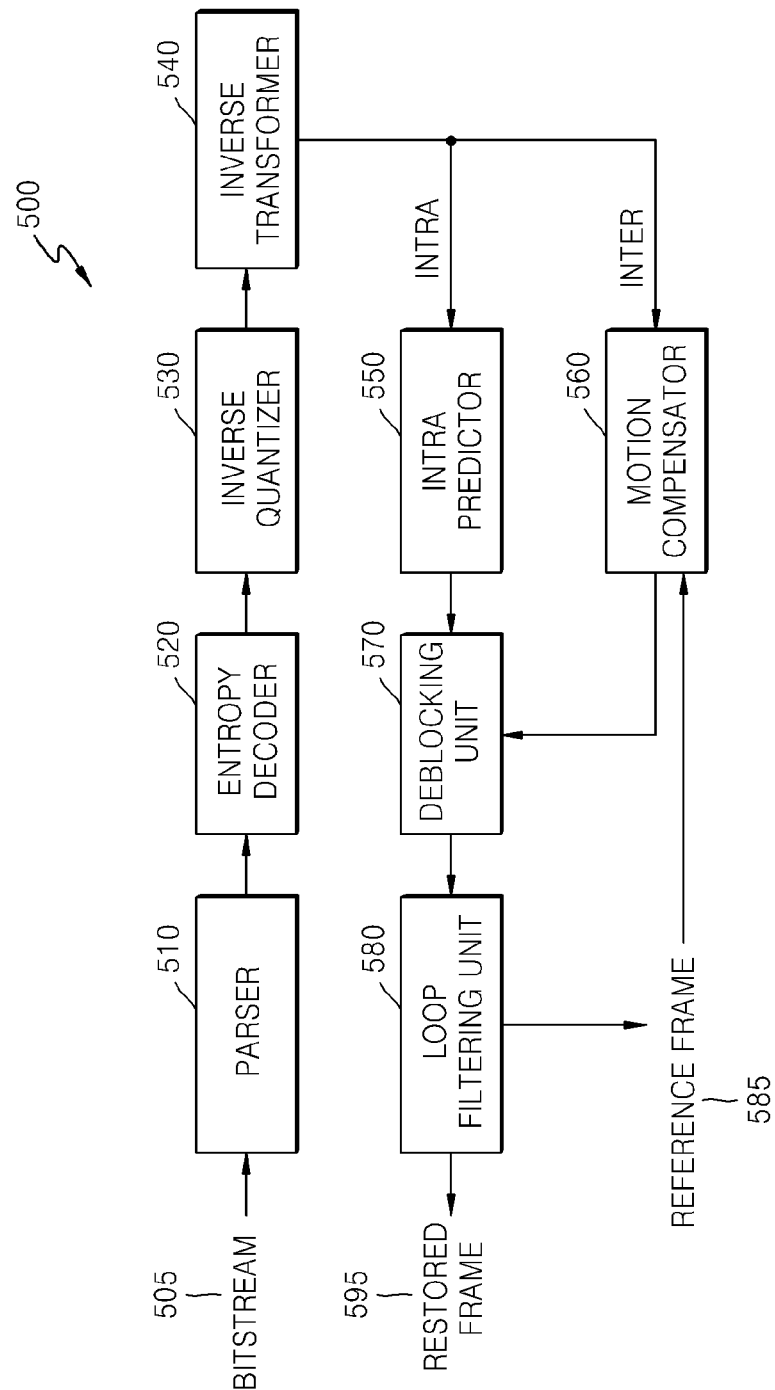
FIG. 12 is a block diagram of an image decoder based on coding units according to an exemplary embodiment.

FIG. 12 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510 performs an operation.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

In particular, when the image decoder 500 decodes an additional view image stream of a multi-view video structure, the motion compensator 560 may perform motion compensation for each respective prediction unit for inter prediction to restore additional view images. When the current additional view anchor picture is restored, if an additional view anchor picture (reference anchor image) that is a reference image of the current additional view anchor picture is not restored, the current additional view anchor picture may be restored by using the base view anchor picture having the same POC order as the current additional view anchor picture and the depth map of the current additional view anchor picture.

Figure 13:
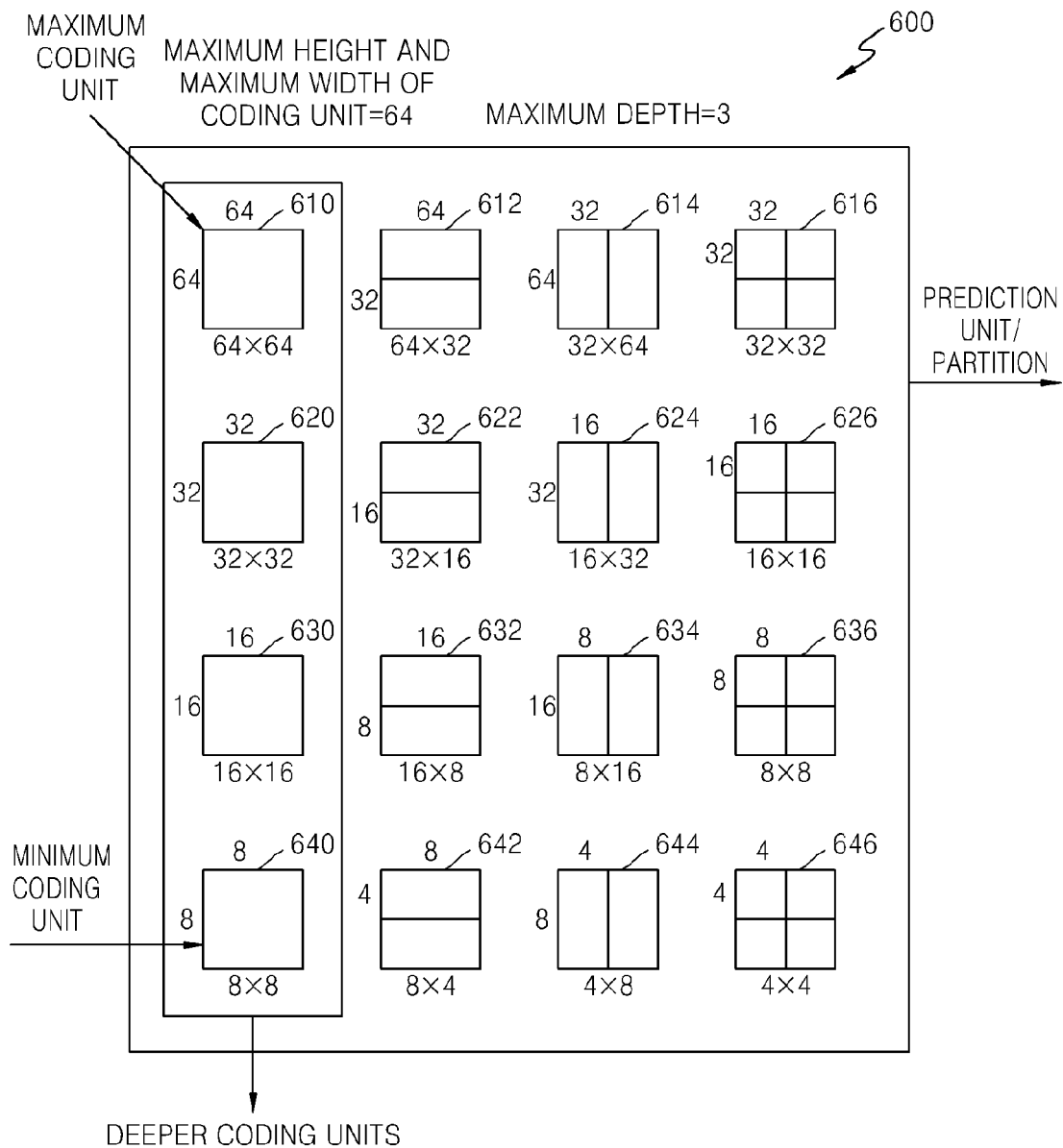
FIG. 13 is a diagram illustrating deeper coding units according to depths, and partitions according to an exemplary embodiment.

FIG. 13 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth refers to a total number of times the coding unit is split from the maximum coding unit to the minimum coding unit. Since a depth increases along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth increases along the vertical axis of the hierarchical structure 600. A depth and a partition having the minimum encoding error in the coding unit 610 may be selected as the coded depth and a partition type of the coding unit 610.

FIG. 14 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 16:
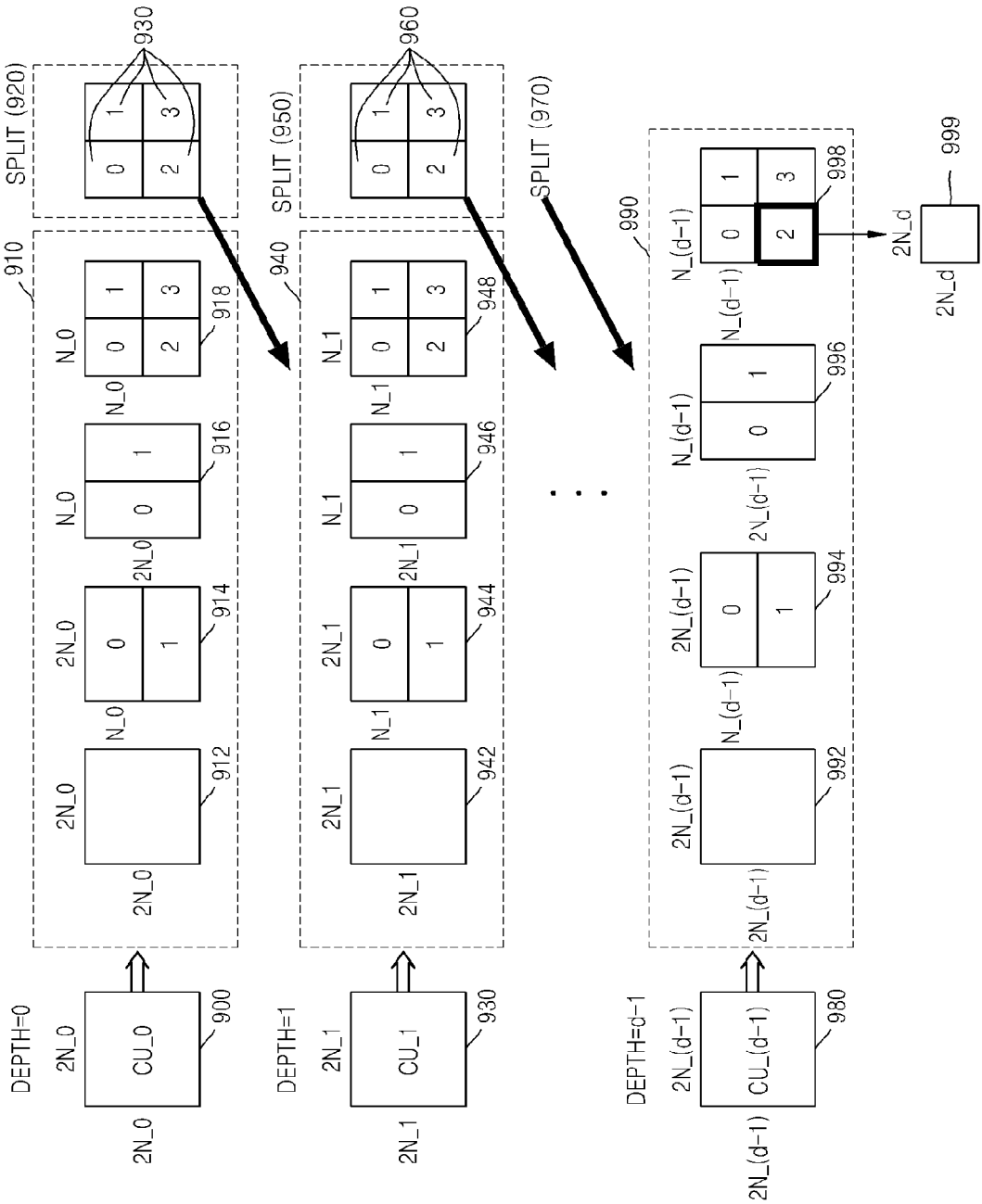
FIG. 16 is a diagram of deeper coding units according to depths, according to an exemplary embodiment.

FIG. 16 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed until a depth becomes d−1, and split information may be encoded for up to when a depth is one of 0 to d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | | | Split Information 0 (Encoding on Coding Unit having Size of 2N × 2N and Current Depth of d) | | |
|---|---|---|---|---|---|
| | | | Size of Transformation Unit | | |
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

Figure 17:
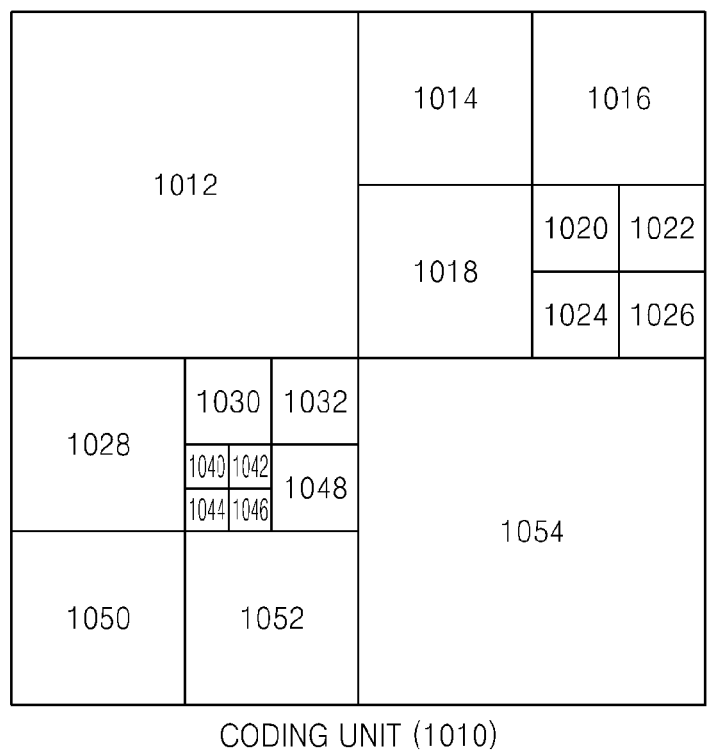
FIGS. 17 through 19 are diagrams for describing a relationship between coding units, prediction units, and transformation units, according to an exemplary embodiment.
Figure 18:
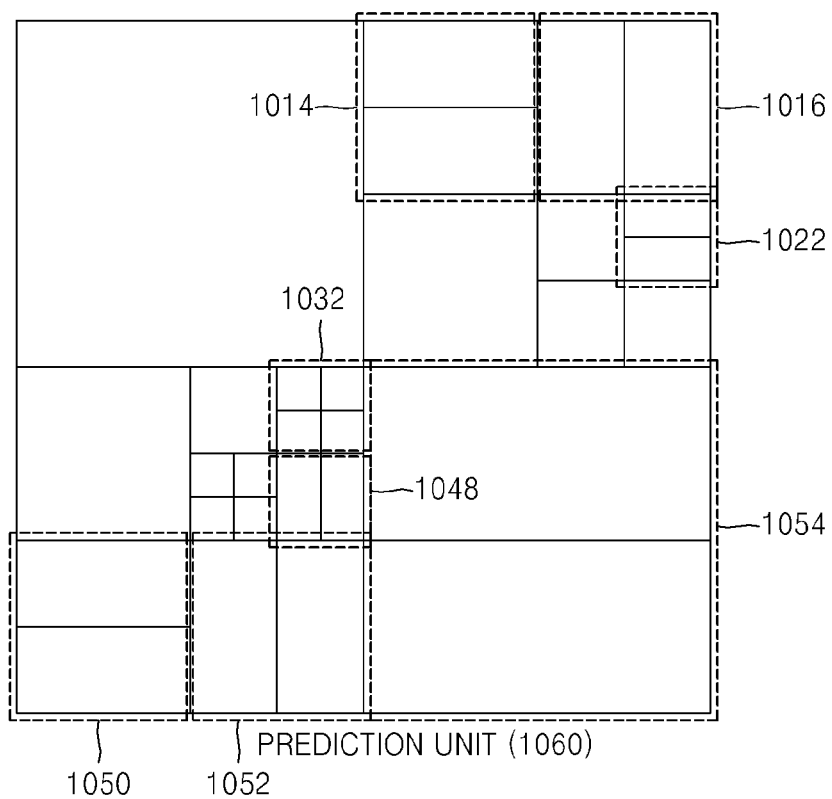
Figure 19:
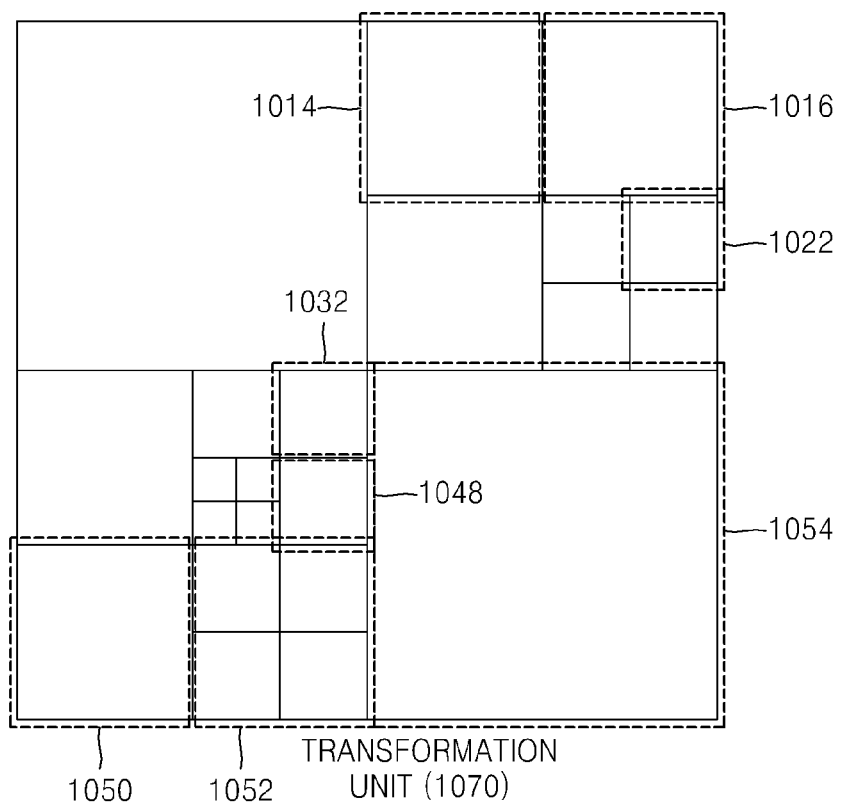

FIGS. 17 through 19 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 20:
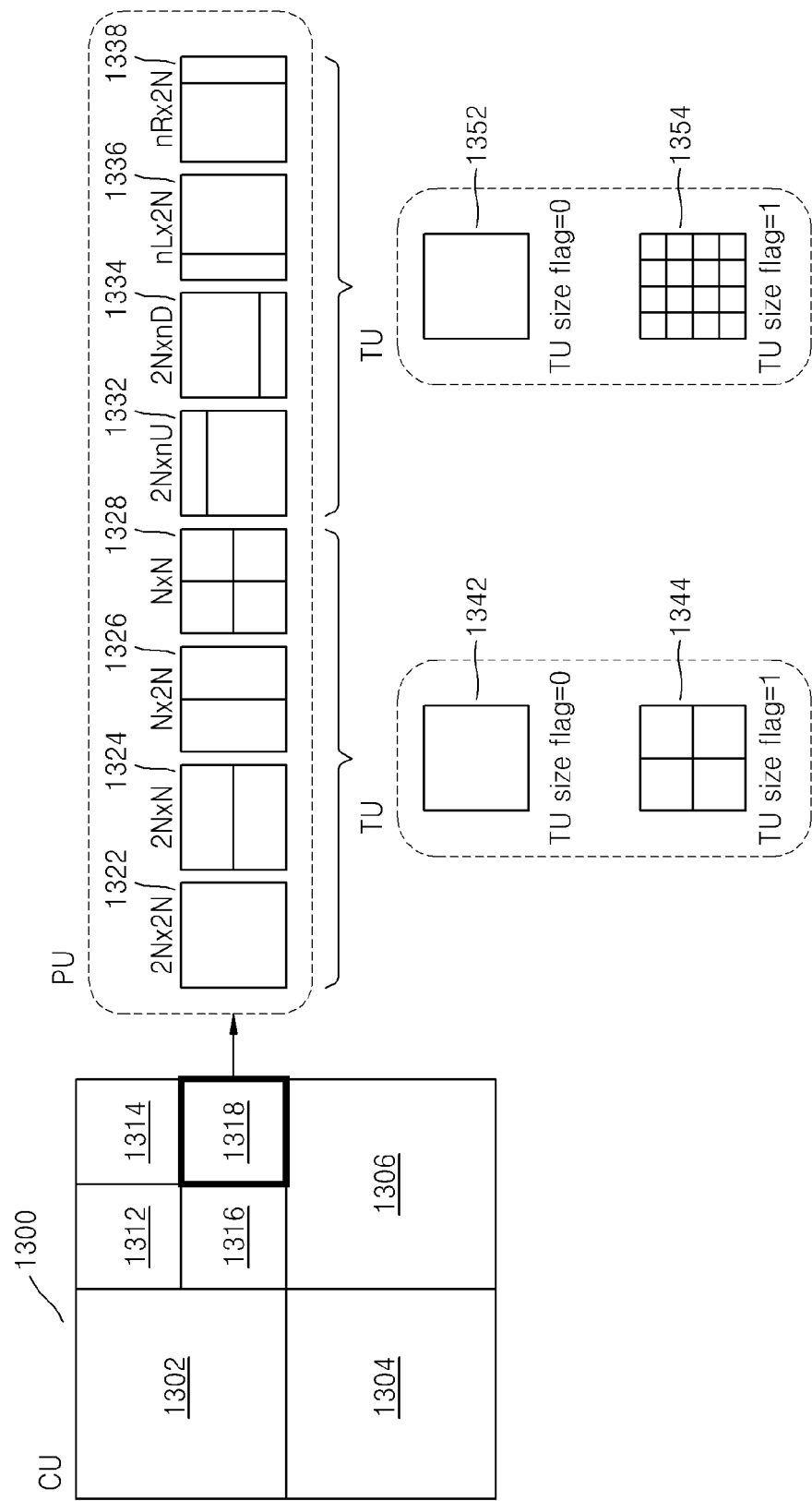
FIG. 20 is a diagram for describing a relationship between a coding unit, a prediction unit or a partition, and a transformation unit, according to encoding mode information of Table 1.

FIG. 20 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU (Transformation Unit) size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. A result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the exemplary embodiments not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

Exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

For convenience of description, a video encoding method according to the multi-view video prediction method, the multi-view video prediction restoring method, or the multi-view video encoding method, which has been described with reference to FIGS. 1A through 20, will be collectively referred to as a 'video encoding method according to the exemplary embodiments'. in addition, the video decoding method according to the multi-view video prediction restoring method or the multi-view video decoding method, which has been described with reference to FIGS. 1A through 20, will be referred to as a 'video decoding method according to the exemplary embodiments'.

A video encoding apparatus including the multi-view video prediction apparatus 10, the multi-view video prediction restoring apparatus 20, the video encoding apparatus 100, or the image encoder 400, which has been described with reference to FIGS. 1A through 20, will be referred to as a 'video encoding apparatus according to the exemplary embodiments'. In addition, a video decoding apparatus including the multi-view video prediction restoring apparatus 20, the video decoding apparatus 200, or the image decoder 500, which has been descried with reference to FIGS. 1A through 20, will be referred to as a 'video decoding apparatus according to the exemplary embodiments'.

A computer readable recording medium storing a program, e.g., a disc 26000, according to an exemplary embodiment will now be described in detail.

Figure 21:
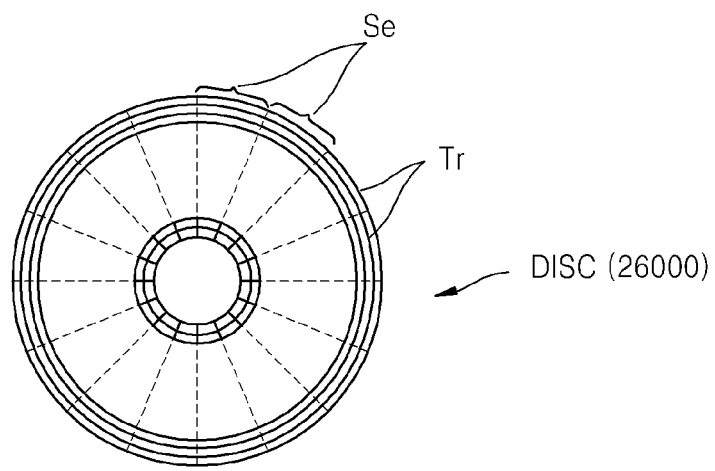
FIG. 21 illustrates a physical structure of a disc that stores a program, according to an exemplary embodiment.

FIG. 21 illustrates a physical structure of a disc 26000 that stores a program, according to an exemplary embodiment. The disc 26000 which is a storage medium may be a hard drive, a compact disc-read only memory (CD-ROM) disc, a Blu-ray disc, or a digital versatile disc (DVD). The disc 26000 includes a plurality of concentric tracks Tf each being divided into a specific number of sectors Se in a circumferential direction of the disc 26000. In a specific region of the disc 26000, a program that executes a method of determining a quantization parameter, a video encoding method, and a video decoding method as described above may be assigned and stored.

A computer system embodied using a storage medium that stores a program for executing a video encoding method and a video decoding method as described above will now be described with reference to FIG. 22.

Figure 22:
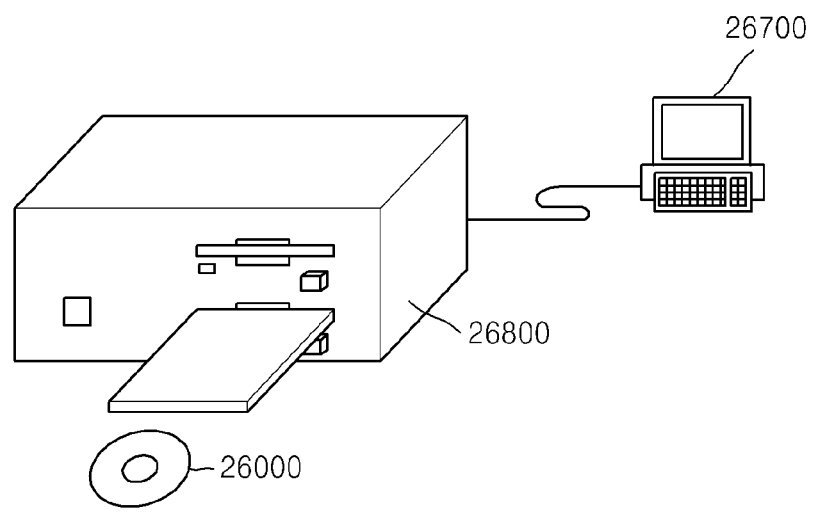
FIG. 22 illustrates a disc drive that records and reads a program by using a disc.

FIG. 22 illustrates a disc drive 26800 that records and reads a program by using a disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one of a video encoding method and a video decoding method according to an exemplary embodiment may be stored not only in the disc 26000 illustrated in FIGS. 21 and 22 but also in a memory card, a ROM cassette, or a solid state drive (SSD).

A system to which the video encoding method and a video decoding method described above are applied will be described below.

Figure 23:
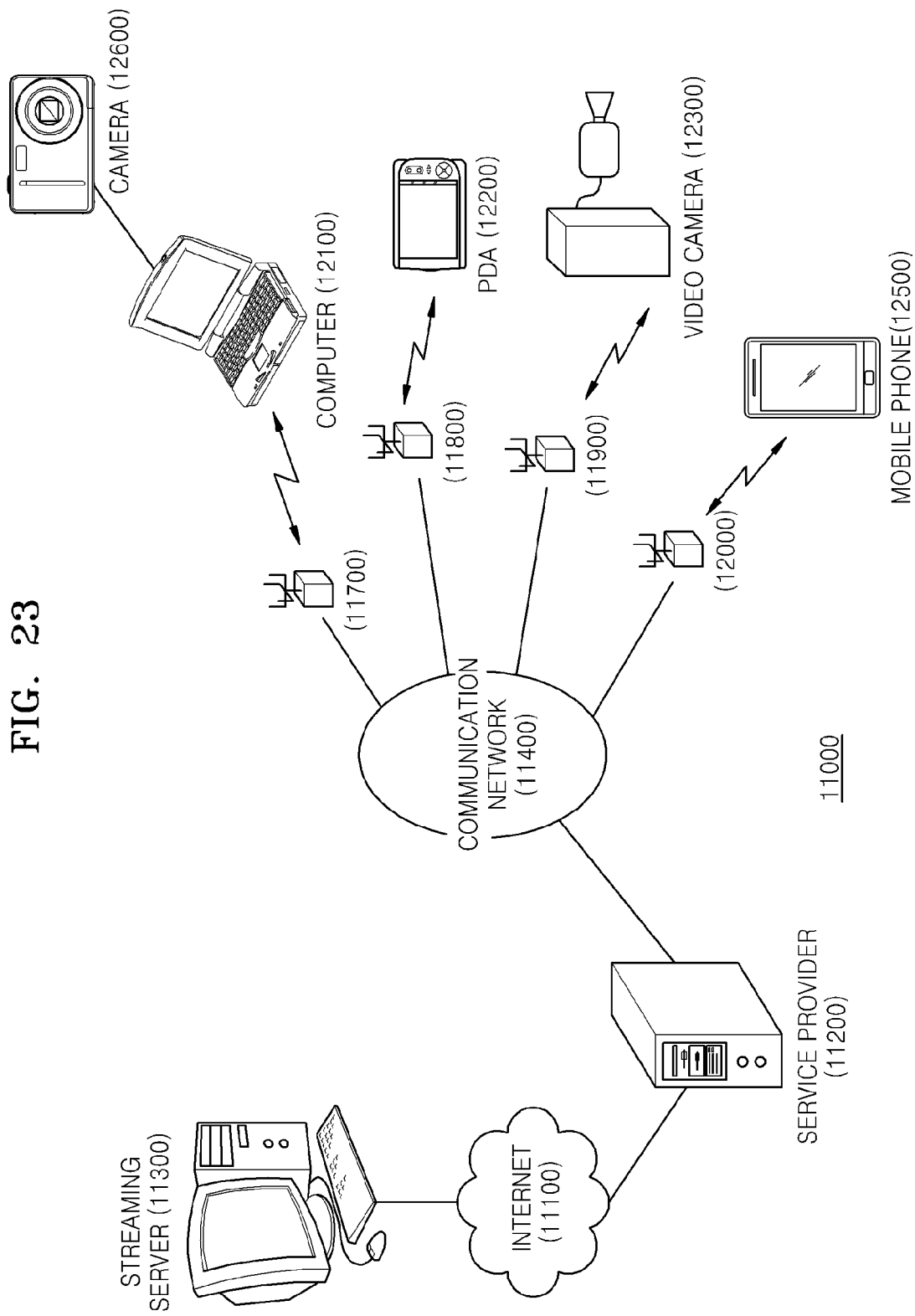
FIG. 23 illustrates an entire structure of a content supply system that provides a content distribution service.

FIG. 23 illustrates an entire structure of a content supply system 11000 that provides a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
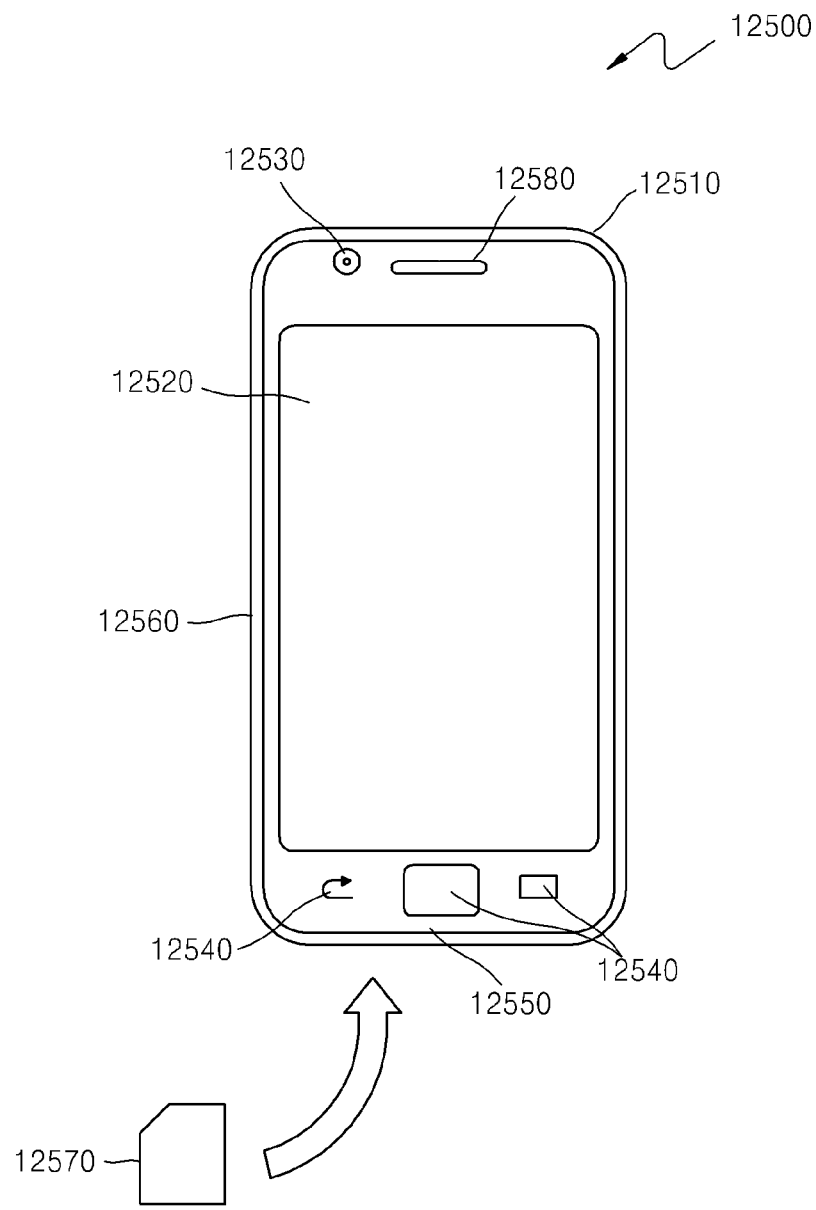
FIGS. 24 and 25 illustrate external and internal structures of a mobile phone to which a video encoding method and a video decoding method are applied, according to an exemplary embodiment.

However, the content supply system 11000 is not limited to that illustrated in FIG. 24, and devices may be selectively connected thereto. The plurality of independent devices may be directly connected to the communication network 11400, rather than via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding of video may be stored in a computer readable recording medium, e.g., a CD-ROM disc, a floppy disc, a hard disc drive, an SSD, or a memory card, which may be accessible by the computer 12100.

If video data is captured by a camera built into the mobile phone 12500, the video data may be received from the mobile phone 12500.

The video data may also be encoded by a large scale integrated circuit (LSI) system installed in the video camera 12300, the mobile phone 12500, or the camera 12600.

According to an exemplary embodiment, the content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with referring to FIGS. 24 and 25.

FIG. 24 illustrates an external structure of a mobile phone 12500 to which a video encoding method and a video decoding method are applied, according to an exemplary embodiment. The mobile phone 12500 may be a smart phone, the functions of which are not limited and a large part of the functions of which may be changed or expanded.

The mobile phone 12500 includes an internal antenna 12510 via which a radio-frequency (RF) signal may be exchanged with the wireless base station 12000 of FIG. 24, and includes a display screen 12520 for displaying images captured by a camera 1253 or images that are received via the antenna 12510 and decoded, e.g., a liquid crystal display (LCD) or an organic light-emitting diodes (OLED) screen. The smart phone 12510 includes an operation panel 12540 including a control button and a touch panel. If the display screen 12520 is a touch screen, the operation panel 12540 further includes a touch sensing panel of the display screen 12520. The smart phone 12510 includes a speaker 12580 for outputting voice and sound or another type sound output unit, and a microphone 12550 for inputting voice and sound or another type sound input unit. The smart phone 12510 further includes the camera 12530, such as a charge-coupled device (CCD) camera, to capture video and still images. The smart phone 12510 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
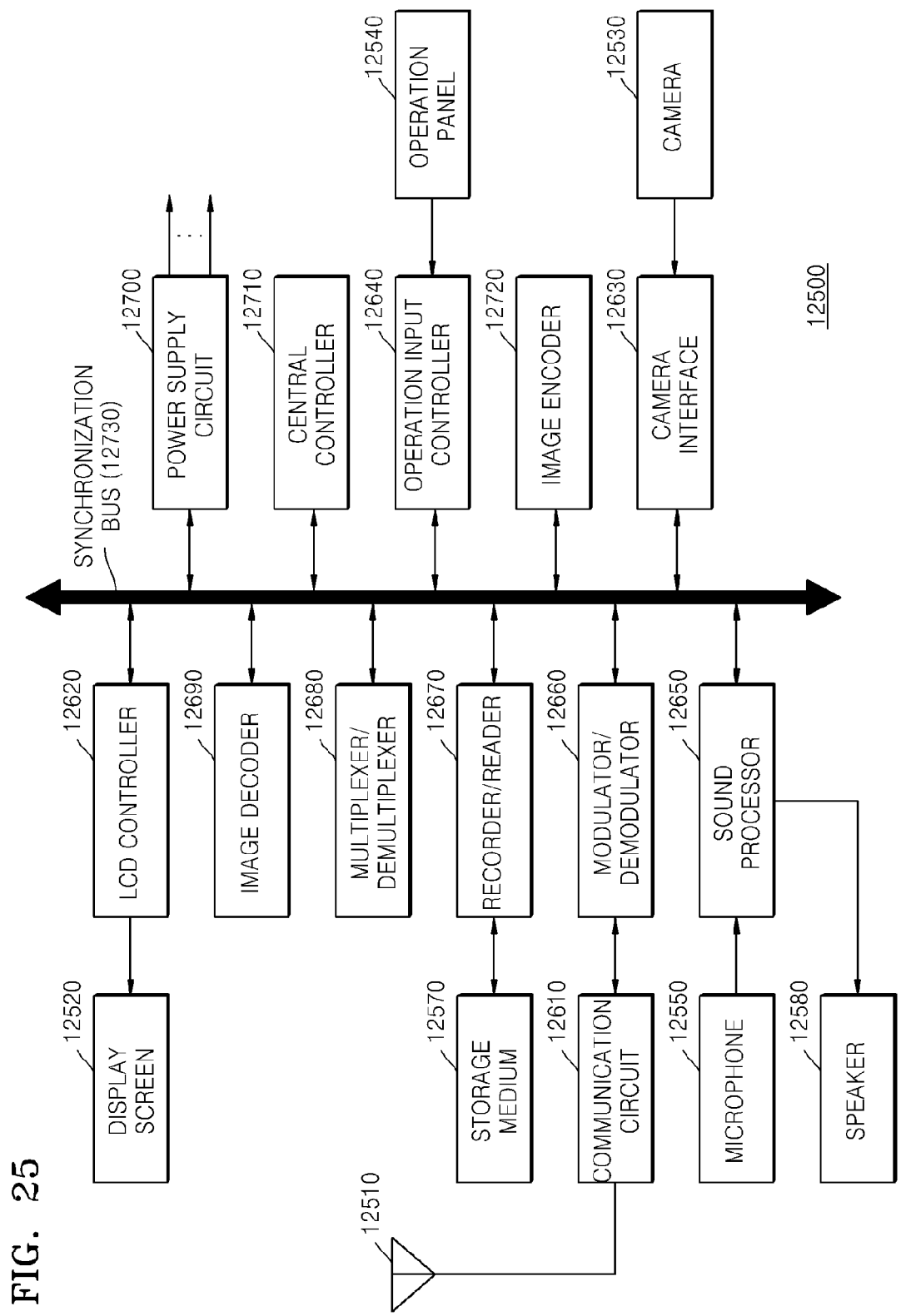

FIG. 25 illustrates an internal structure of the mobile phone 12500, according to an exemplary embodiment. To systemically control parts of the mobile phone 12500 including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a random access memory (RAM).

While the mobile phone 12500 transmits communication data to the outside, a digital signal is generated in the mobile phone 12500 under control of the central controller. For example, the sound processor 12650 may generate a digital sound signal, the image encoding unit 12720 may generate a digital image signal, and text data of a message may be generated via the operation panel 12540 and the operation input controller 12640. When a digital signal is delivered to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the image encoding unit 12720 via the camera interface 12630. The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be delivered to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 1266 and the sound processor 12650, and the analog sound signal is output via the speaker 12580, under control of the central controller 12710.

When in the data communication mode, data of a video file accessed at an Internet website is received, a signal received from wireless base station 12000 via the antenna 12510 is output as multiplexed data via the modulation/demodulation unit 1266, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 1269 may decode the encoded video data to obtain restored video data and provide the restored video data to the display screen 12520 via the LCD controller 12602, according to the video decoding method described above.

Thus, the data of the video file accessed at the Internet website may be displayed on the display screen 12520. At the same time, the sound processor 1265 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 26:
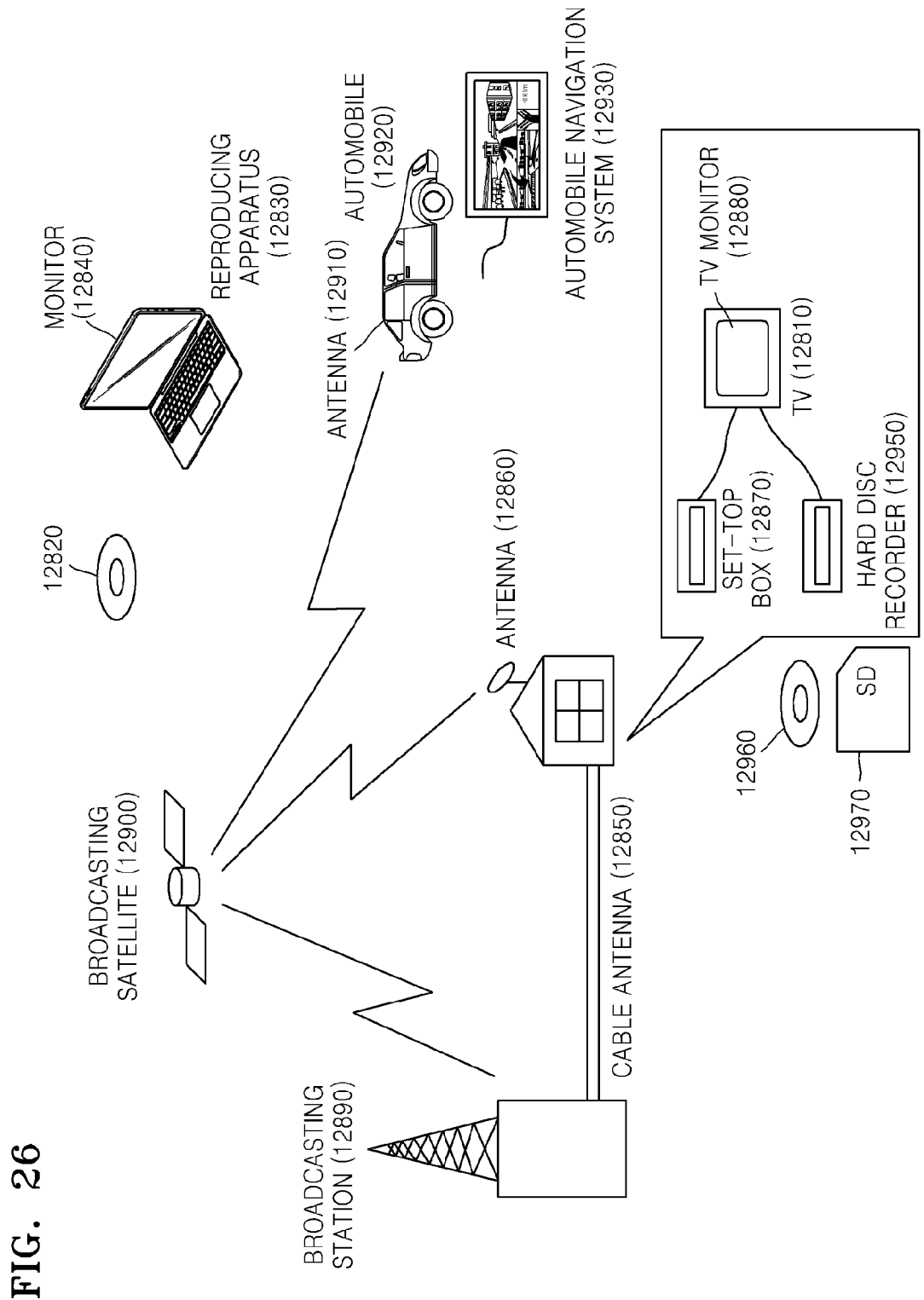
FIG. 26 illustrates a digital broadcasting system employing a communication system, according to an exemplary embodiment.

A communication system according to exemplary embodiments not limited to the communication system described above with reference to FIG. 24. For example, FIG. 26 illustrates a digital broadcasting system employing a communication system, according to an exemplary embodiment. The digital broadcasting system of FIG. 26 may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 including an appropriate antenna 12910 may receive a signal transmitted from the satellite 12900 or the wireless base station 11700. A decoded video may be reproduced on a display screen of an automobile navigation system 12930 built into the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not be included in the camera 12530, the camera interface 12630, or the image encoding unit 12720 of FIG. 26.

Figure 27:
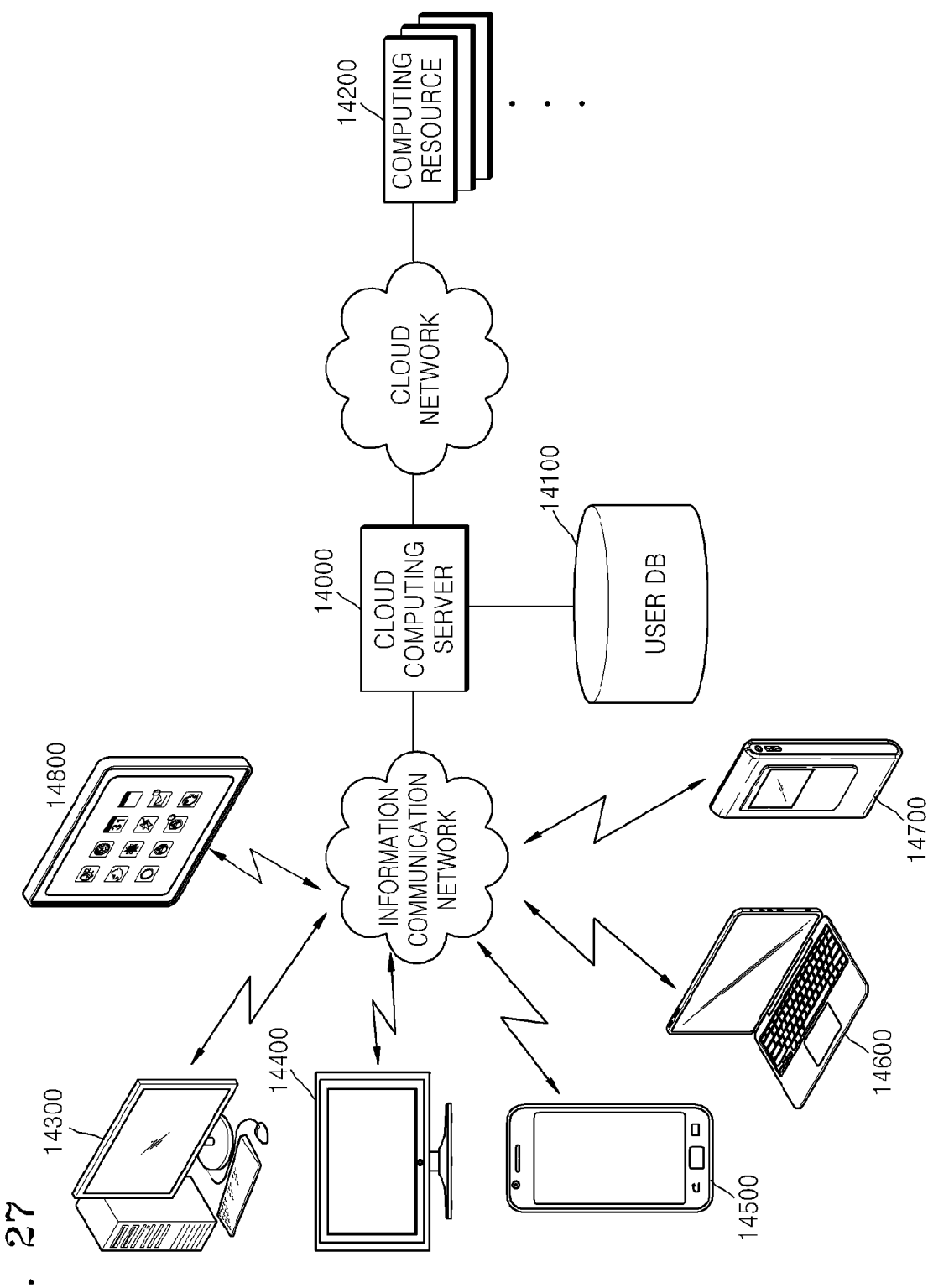
FIG. 27 illustrates a network structure of a cloud computing system using a video encoding apparatus and a video decoding apparatus, according to an exemplary embodiment.

FIG. 27 illustrates a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, storage, an operating system (OS), and security, in his/her own terminal in order to use them, but may select and use desired services from among services in a virtual space generated through the virtualization technology, at a desired point of time.

A user terminal of a specified service user is connected to the cloud computing server 14100 via a data communication network including the Internet and a mobile telecommunication network. User terminals may be provided with cloud computing services, and particularly video reproduction services, from the cloud computing server 14100. The user terminals may be various types of electronic devices capable of being connected to the Internet, e.g., a desk-top PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of the combining. The plurality of computing resources 14200 may include various data services, and may include data uploaded from user terminals. As described above, the cloud computing server 14100 may provide user terminals with desired services by combining video databases distributed in different regions according to the virtualization technology.

User information about users who has subscribed to a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14100 searches for and reproduces this video service, based on the user DB 14100. When the smart phone 14500 receives a video data stream from the cloud computing server 14100, a process of reproducing video by decoding the video data stream is similar to an operation of the mobile phone 12500 described above with reference to FIG. 24.

The cloud computing server 14100 may refer to a reproduction history of a desired video service, stored in the user DB 14100. For example, the cloud computing server 14100 receives a request to reproduce a video stored in the user DB 14100, from a user terminal. If this video was being reproduced, then a method of streaming this video, performed by the cloud computing server 14100 may vary according to the request from the user terminal, i.e., according to whether the video will be reproduced, starting from a start thereof or a pausing point thereof. For example, if the user terminal requests to reproduce the video, starting from the start thereof, the cloud computing server 14100 transmits streaming data of the video starting from a first frame thereof to the user terminal. If the user terminal requests to reproduce the video, starting from the pausing point thereof, the cloud computing server 14100 transmits streaming data of the video starting from a frame corresponding to the pausing point, to the user terminal.

In this case, the user terminal may include a video decoding apparatus as described above with reference to FIGS. 1A through 20. As another example, the user terminal may include a video encoding apparatus as described above with reference to FIGS. 1A through 20. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to exemplary embodiments described above with reference to FIGS. 1A through 20 have been described above with reference to FIGS. 21 through 27. However, methods of storing the video encoding method and the video decoding method in a storage medium or methods of implementing the video encoding apparatus and the video decoding apparatus in a device according to various exemplary embodiments are not limited to the exemplary embodiments described above with reference to FIGS. 21 through 27.

While exemplary embodiments have been particularly shown and described with reference to drawings, it will be understood by those of ordinary skill in the art that various changes in form and details may be made therein without departing from the spirit and scope according to the inventive concept as defined by the following claims.

The invention claimed is:

1. A multi-view video decoding method comprising:
   obtaining a base view image stream and an additional view image stream;
   reconstructing an anchor picture of a base view that is a first random access image and an I-picture type image, by using the base view image stream;

reconstructing an image of the base view that precedes, in display order, the anchor picture of the base view and follows, in decoding order, the anchor picture of the base view, wherein the reconstructing includes performing motion compensation by referring to an image of the base view that precedes, in decoding order, the anchor picture of the base view, by decoding the base view image stream;

reconstructing a first anchor picture of an additional view that is a second random access image, wherein the reconstructing includes performing disparity compensation by referring to a decoded anchor picture of the base view, by decoding the additional view image stream; and reconstructing an image of the additional view that precedes, in display order, the first anchor picture of the additional view and follows, in decoding order, the first anchor picture of the additional view, wherein the reconstructing includes performing disparity compensation by referring to a decoded base view image and performing motion compensation without referring to an image of the additional view that precedes, in decoding order, the first anchor picture of the additional view, by decoding the additional view image stream.

2. The multi-view video decoding method of claim 1, wherein the image of the additional view that precedes, in decoding order, the first anchor picture of the additional view is a second anchor picture of the additional view.

* * * * *